United States Patent [19]
Hotta et al.

[11] Patent Number: 5,071,398
[45] Date of Patent: Dec. 10, 1991

[54] INTEGRAL-TYPE PLANETARY GEAR TRANSMISSION SEPARABLE BY CLUTCH

[75] Inventors: Takashi Hotta; Yukio Morita, both of Asaka; Yoichi Kojima, Shiki; Kimihiko Kikuchi, Tokorozawa; Tsunefumi Niiyama, Kamifukuoka; Yorinori Kumagai, Kawaguchi; Shinichi Sakaguchi, Shiki; Tomoharu Kumagai, Nerima, all of Japan

[73] Assignee: Honda Giken Kogyo Kabushiki Kaisha, Tokyo, Japan

[21] Appl. No.: 676,874

[22] Filed: Mar. 28, 1991

[30] Foreign Application Priority Data

Mar. 28, 1990 [JP] Japan ................................ 2-080532

[51] Int. Cl.⁵ .............................................. F16H 3/62
[52] U.S. Cl. ..................................... 475/276; 475/277
[58] Field of Search ................ 475/276, 277, 278, 280

[56] References Cited

U.S. PATENT DOCUMENTS

| | | | |
|---|---|---|---|
| 3,811,343 | 5/1974 | Mori et al. | 475/280 X |
| 3,941,013 | 3/1976 | Miller | 475/276 |
| 4,660,439 | 4/1987 | Hiraiwa | 475/276 |
| 4,963,124 | 10/1990 | Takahashi et al. | 475/277 X |

FOREIGN PATENT DOCUMENTS

| | | |
|---|---|---|
| 0371651 | 6/1990 | European Pat. Off. |
| 0378900 | 7/1990 | European Pat. Off. |
| 0381538 | 8/1990 | European Pat. Off. |
| 1460686 | 1/1977 | United Kingdom |

Primary Examiner—Dirk Wright
Attorney, Agent, or Firm—Lyon & Lyon

[57] ABSTRACT

A planetary gear transmission for use on automobiles includes an input shaft, an output gear, and three planetary gear trains disposed coaxially with each other and each having a sun gear element, a carrier element, and a ring gear element, two of the elements of each of the planetary gear trains being mechanically coupled to elements of the other planetary gear trains for rotation therewith. The elements which are mechanically coupled to each other provide first through fifth rotating members, the first and fifth rotating members being coupled to the input shaft, one of the second and third rotating members being coupled to the output gear, the fourth rotating member being coupled to the output gear. The planetary gear transmission also has a separating clutch disposed between the elements of the third rotating member, for selectively engaging and disengaging the elements of the third rotating member.

9 Claims, 16 Drawing Sheets

| RANGE | K1 | K2 | K3 | B1 | B2 | B3 | RATIO |
|---|---|---|---|---|---|---|---|
| LOW |  |  |  | O | (O) |  | 3.500 |
| 2ND |  |  | O |  | O |  | 1.937 |
| 3RD |  |  | O |  |  | O | 1.300 |
| 4TH |  | O | O |  |  |  | 1.000 |
| 5TH |  | O |  |  |  | O | 0.680 |
| REV | O |  |  |  | O |  | -2.125 |

| | ROTATIONAL MEMBER | | | | |
|---|---|---|---|---|---|
| | 1ST | 2ND | 3RD | 4TH | 5TH |
| G1 | | | R1 | C1 | S1 |
| G2 | | S2 | C2 | R2 | |
| G3 | S3 | C3 | R3 | | |

| RANGE | K1 | K2 | K3 | B1 | B2 | B3 | RATIO |
|---|---|---|---|---|---|---|---|
| LOW |  |  |  | O |  | O | 3.625 |
| 2ND | O |  |  |  |  | O | 2.050 |
| 3RD | O |  |  |  | O |  | 1.339 |
| 4TH | O |  | O |  |  |  | 1.000 |
| 5TH |  |  | O |  | O |  | 0.677 |
| REV |  | O |  |  |  | O | 2.100 |

| RANGE | K1 | K2 | K3 | B1 | B2 | B3 | RATIO |
|---|---|---|---|---|---|---|---|
| LOW |  |  |  | O |  | O | 3.625 |
| 2ND | O |  |  |  |  | O | 2.004 |
| 3RD | O |  |  |  | O |  | 1.301 |
| 4TH | O |  | O |  |  |  | 1.000 |
| 5TH |  |  | O |  | O |  | 0.700 |
| REV |  | O |  |  |  | O | 2.333 |

| ROTATIONAL MEMBER | | | | | |
|---|---|---|---|---|---|
| | 1ST | 2ND | 3RD | 4TH | 5TH |
| G1 | | | R1 | C1 | S1 |
| G2 | S2 | C2 | | R2 | |
| G3 | | S3 | C3 | R3 | |

| RANGE | K1 | K2 | K3 | B1 | B2 | B3 | RATIO |
|---|---|---|---|---|---|---|---|
| LOW | | | | O | O | | 3.625 |
| 2ND | O | | | | O | | 2.004 |
| 3RD | O | | | | | O | 1.317 |
| 4TH | O | O | | | | | 1.000 |
| 5TH | | O | | | | O | 0.879 |
| REV | | | O | | O | | 2.162 |

INTEGRAL-TYPE PLANETARY GEAR TRANSMISSION SEPARABLE BY CLUTCH

BACKGROUND OF THE INVENTION

The present invention relates to a clutch-separable integral-type planetary gear transmission including three planetary gear trains with two elements in each gear train being coupled together.

Planetary gear transmissions are widely used as automatic transmissions for automobiles. Many conventional planetary gear transmissions comprise an integral combination of two planetary gear trains, as with the Ravigneaux gear train, the Simpson gear train, or the like, and generally have up to four forward gear positions. For better running characteristics of automobiles, there have been proposed and used transmissions having five or more forward gear positions.

Such multiple-gear-position transmissions are disclosed in Japanese Laid-Open Patent Publication No. 63(1988)-318349, Japanese Laid-Open Utility Model Publication No. 61(1986)-103654, for example. The disclosed transmissions comprise two planetary gear trains, three clutches and a brake combined with each of the planetary gear trains, and have six forward gear positions and a single reverse gear position. Since there are only two planetary gear trains, the above disclosed transmissions and the conventional transmissions may employ common components. However, the disclosed transmissions must be controlled according to a complex control process because some gearshifts require simultaneous disengagement of two engaging components (a clutch and a brake) and engagement of other two engaging components.

For example, when the disclosed transmissions are shifted from the second gear position to the third gear position or vice versa, it is necessary to disengage one clutch and one brake and also to engage another clutch and another brake.

Japanese Laid-Open Patent Publications Nos. 59(1984)-222644 and 1(1989)-320362 show transmissions with three planetary gear trains. In each of the disclosed transmissions, two components of each of the planetary gear trains are mechanically coupled to components of the other planetary gear trains, and four clutches and three brakes are coupled to the planetary gear trains. The transmissions have five forward gear positions and one reverse gear position which can be established by controlling operation of these engaging components, i.e., the clutches and the brakes. All successive gearshifts between the five forward gear positions can be achieved by engaging one engaging component (a clutch or a brake) and engaging another engaging component. Therefore, these transmissions can be controlled relatively simply.

However, the transmissions with three planetary gear trains are disadvantageous in that either one of elements (i.e., a sun gear, a carrier, and a ring gear) of the planetary gear trains overspeeds, i.e., rotates at a considerably higher speed than the rotational speed of the engine (i.e., the input rotational speed), in some speed ranges (e.g., a LOW (1st) range, a 5th range, and a REV range). While these transmissions can be used in combination with low-speed engines such as diesel engines, difficulty is experienced in combining them with high-speed engines.

For increasing gear positions from the four gear positions to five gear positions, the range of speed reduction ratios, i.e., from the first gear position (LOW) to the fifth gear position, is required to be greater than the range of speed reduction ratios from the first gear position to the fourth gear position for improved running characteristics of automobiles. If the range of speed reduction ratios is widened, however, the above overspeed problem tends to become worse.

SUMMARY OF THE INVENTION

It is an object of the present invention to provide an integral-type planetary gear transmission having three planetary gear trains, which can easily be designed for multiple gear positions.

Another object of the present invention is to provide an integral-type planetary gear transmission having three planetary gear trains, which can effect gearshifts between successive gear positions through disengagement of one engaging component (a clutch or a brake) and engagement of another engaging component, and which can easily be controlled for gearshifts.

Still another object of the present invention is to provide an integral-type planetary gear transmission having three planetary gear trains, which prevents any of elements such as sun gears, carriers, and ring gears of the planetary gear trains from overspeeding.

According to the present invention, there is provided a planetary gear transmission comprising an input member, an output member, three planetary gear trains disposed coaxially with each other and each having a sun gear element, a carrier element, and a ring gear element, two of the elements of each of the planetary gear trains being mechanically coupled to elements of the other planetary gear trains for rotation therewith, the elements which are mechanically coupled to each other providing first through fifth rotating members, the first and fifth rotating members being coupled to the input member, one of the second and third rotating members being coupled to the output member, the fourth rotating member being coupled to the output member, and a separating clutch disposed between the elements of the third rotating member, for selectively engaging and disengaging the elements of the third rotating member.

In a gear position or speed range in which an element would suffer overspeed, the separating clutch is disengaged to disconnect the elements of the third rotating member, thus avoiding any overspeed problem.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

There are four types of planetary gear transmissions according to different embodiments of the present invention. These different types of planetary gear transmissions are referred to as type 1, type 2, type 3, and type 4, which will separately be described below.

Type 1

Figures 1, 2:
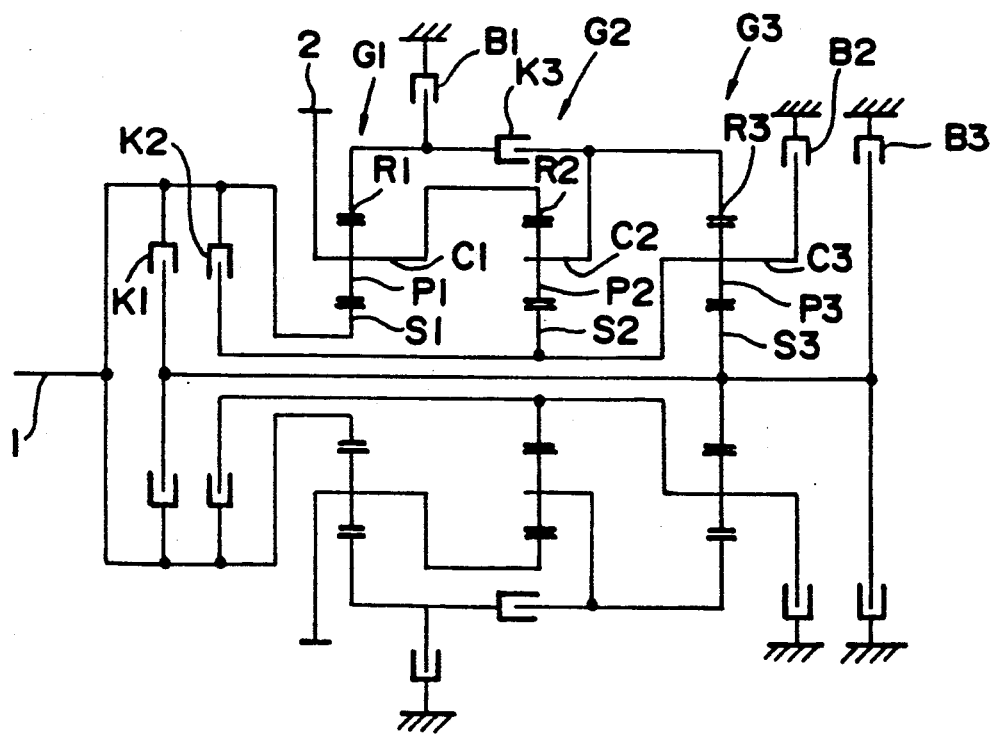
FIG. 1 is a skeleton diagram showing a planetary gear transmission according to an embodiment of the present invention.
FIG. 2 is a table showing the relationship between operation of clutches and brakes and gear ranges of the planetary gear transmission shown in FIG. 1.

The skeleton of a planetary gear transmission of type 1 is shown in FIG. 1. The planetary gear transmission shown in FIG. 1 has first, second, and third planetary gear trains G1, G2, G3 disposed coaxially with and parallel to each other. The planetary gear trains G1, G2, G3 have respective first, second, and third sun gears S1, S2, S3 positioned centrally, respective first, second, and third planetary pinions P1, P2, P3 meshing with the sun gears S1, S2, S3, respectively, and rotatable about their own axes while revolving around the sun gears S1, S2, S3, respective first, second, and third carriers C1, C2, C3 on which the respective planetary pinions P1, P2, P3 are rotatably supported and which are rotatable therewith around the sun gears S1, S2, S3, respectively, and respective first, second, and third ring gears R1, R2, R3 having internal gear teeth meshing with the planetary pinions P1, P2, P3, respectively.

The first sun gear S1 is coupled to an input shaft 1 at all times, and the first carrier C1 is coupled to the second ring gear R2 and an output gear 2. The first ring gear R1 is associated with a first brake B1 which can hold the first ring gear R1 against rotation. The first ring gear R1 is selectively engageable with and disengageable from the second carrier C2 and the third ring gear R3 through a third clutch K3. The second carrier C2 and the third ring gear R3 are coupled to each other. The second sun gear S2 is selectively engageable with and disengageable from the input shaft 1 through a second clutch K2, and is coupled to the third carrier C3. The second sun gear S2 and the third carrier C3 which are coupled to each other can be held against rotation by a second brake B2. The third sun gear S3 is selectively engageable with and disengageable from the input shaft 1 through a first clutch K1, and can be held against rotation by a third brake B3.

The planetary gear elements including the first, second, third sun gears S1, S2, S3, the first, second, and third carriers C1, C2, C3, and the first, second, and third ring gears R1, R2, R3 are coupled between the input shaft 1 and the output gear 2 as described above. In the planetary gear transmission constructed as described above, gear positions can be established and gearshifts can be controlled by selectively engaging and disengaging the first, second, and third clutches K1, K2, K3 and the first, second, and third brakes B1, B2, B3. More specifically, five forward gear positions or speed ranges (LOW, 2ND, 3RD, 4TH, and 5TH) and one reverse gear position or range (REV) can be established by engaging and disengaging the clutches and the brakes as shown in FIG. 2. In FIG. 2, those clutches and brakes which are indicated by a circle are engaged. However, the circle which indicates the second brake B2 in the LOW range is placed in parentheses because the second brake B2 in the LOW range does not contribute to the transmission of drive forces though it is engaged. Speed reduction ratios of the transmission in the respective speed ranges vary depending on the number of teeth of the gears, and are given only by way of example in FIG. 2.

As can be seen from the table of FIG. 2, each of the five forward gear positions or speed ranges (LOW through 5TH) can be established by engaging two of the clutches and the brakes (which will be referred to as engaging means). To effect a gearshift between two successive speed ranges, one of the two engaging means is disengaged and another engaging means is engaged, but the two engaging means are not required to be engaged or disengaged simultaneously. Therefore, the transmission can be controlled simply for gearshifts.

Figures 3, 5:
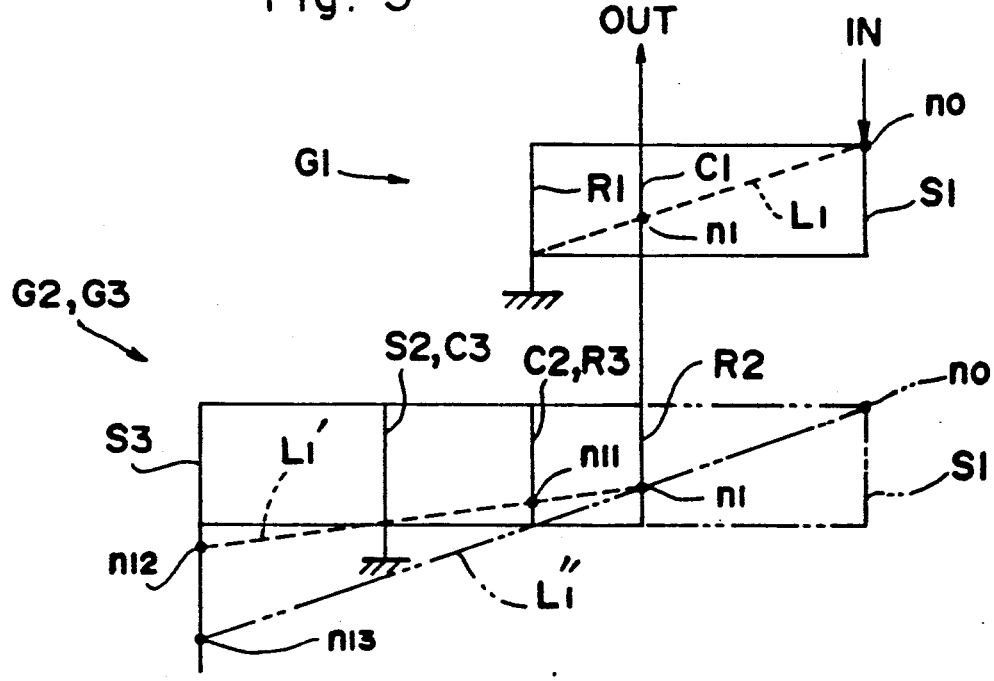
FIG. 3 is a table showing the coupling relationship between elements of planetary gear trains of the planetary gear transmission shown in FIG. 1.
FIGS. 4 through 7 are diagrams showing the speed relationship between the elements of the planetary gear trains of the planetary gear transmission shown in FIG. 1.

The coupling relationship between the elements (including the sun gears, the carriers, and the ring gears) of the planetary gear trains of the above planetary gear transmission is illustrated in FIG. 3. The third sun gear S3 singly serves as a first rotating member. The second sun gear S2 and the third carrier C3 which are coupled to each other jointly serve as a second rotating member. The first ring gear R1, the second carrier C2, and the third ring gear R3 which are coupled together jointly serve as a third rotating member. The first carrier C1 and the second ring gear R2 which are coupled together jointly serve as a fourth rotating member. The first sun gear S1 singly serves as a fifth rotating member. As shown in FIG. 1, the third clutch K3 is disposed between the first ring gear R1, and the second carrier C2 and the third ring R3, which serve as the third rotating member, and selectively connect and disconnect these elements.

Figure 4:
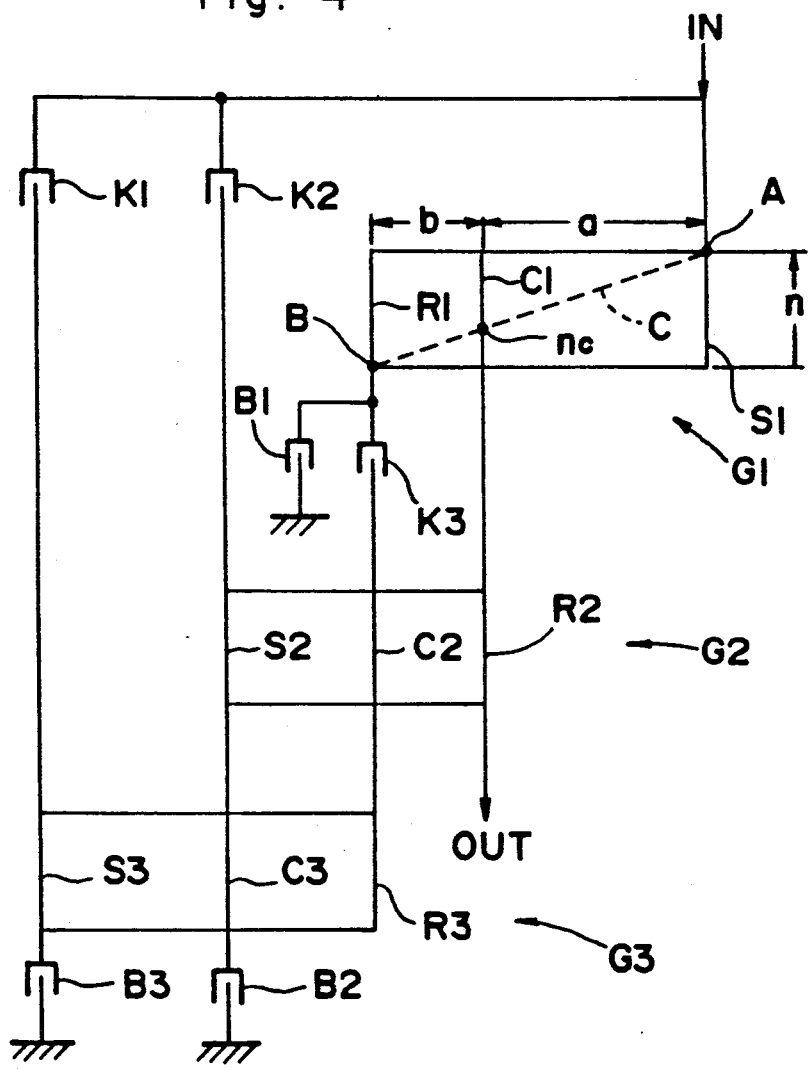

The relationship between the speeds of the various elements of the type-1 transmission is shown in FIG. 4. Speed reduction ratios in the speed ranges of the transmission will be described below with reference to FIG. 4.

In FIG. 4, the first, second, and third planetary gear trains G1, G2, G3 are separately plotted, and the vertical lines in the planetary gear trains indicate the elements thereof, and have lengths representing the rotational speeds of the elements. The distance between the vertical lines are proportional to the reciprocals of the number of teeth of the sun gears and ring gears.

For example, the three vertical lines shown in the first planetary gear train G1 correspond to the first sun gear S1, the first carrier C1, and the first ring gear R1, respectively, from the right. The upward lengths of these vertical lines indicate the rotational speeds n of these elements in the forward direction. The distance "a" between the vertical line indicating the first sun gear S1 and the vertical line indicating the first carrier C1 corresponds to the reciprocal ($=1/Zs$) of the number Zs of teeth of the first sun gear S1. The distance "b" between the vertical line indicating the first carrier C1 and the vertical line indicating the first ring gear R1 corresponds to the reciprocal ($=1/Zr$) of the number Zr of teeth of the first ring gear R1. When the first sun gear S1 coupled to the input shaft 1 is rotated at the rotational speed n and the first ring gear R1 is held against rotation by the first brake B1, the first carrier C1 rotates at a rotational speed nc which is indicated by a point of intersection between the vertical line indicating the first carrier C1 and a line C that interconnects a point A indicating the rotating condition of the first sun gear S1 and a point B indicating the fixed condition of the first ring gear R1.

The second and third planetary gear trains G2, G3 are also defined in the same manner as described above, with the first, second, and third clutches K1, K2, K3 and the first, second, and third brakes B1, B2, B3 being shown as being associated with those elements which are coupled therewith.

The rotational speeds of the output gear 2 corresponding to the rotational speeds of the input shaft 1 in the respective speed ranges will be determined using speed diagrams below.

In the LOW range, all the clutches K1, K2, K3 and the third brake B3 are disengaged, and the first and second brakes B1, B2 are engaged. Since the second carrier C2 and the third ring gear R3 are mechanically coupled to each other and the second sun gear S2 and the third carrier C3 are mechanically coupled to each other, i.e., the two elements in each pair are mechanically coupled to each other, the second and third planetary gear trains G2, G3 operate as an integral planetary gear whose speed diagram may be combined as shown in FIG. 5. Because the third clutch K3 is disengaged, the first planetary gear train G1 is separate from the integrally combined second and third planetary gear trains G2, G3, and only one element (first carrier C1) of the first planetary gear train G1 is coupled to the second and third planetary gear trains G2, G3. Thus, the third clutch K3 acts as a separating clutch.

If the rotational speed of the input shaft 1 is indicated by n0, then the rotational speed of the first sun gear S1 coupled to the input shaft 1 is also indicated by n0. Inasmuch as the first ring gear R1 is held or fixed against rotation by the first brake B1, the first carrier C1, i.e., the output gear 2, rotates at a rotational speed n1 which is indicated by a point of intersection between the vertical line indicating the first carrier C1 and a dotted straight line L1 (FIG. 5) that interconnects the point indicating the rotating condition of the first sun gear S1 and the point indicating the fixed condition of the first ring gear R1.

As the first carrier C1 is coupled to the second ring gear R2, the second ring gear R2 also rotates at the rotational speed n1. In the integrally combined second and third planetary gear trains G2, G3, the second sun gear S2 and the third carrier C3 are held or fixed against rotation by the second brake B2. Consequently, a dotted straight line L1' is drawn between a point indicating the rotating condition of the second ring gear R2 at the rotational speed n1 and a point indicating the fixed condition of the second sun gear S2 and the third carrier C3, and points of intersection with the dotted straight line L1' indicate the rotational speeds of other elements. Specifically, the second carrier C3 and the third ring gear R3 rotate at a rotational speed n11, and the third sun gear S3 rotates at a rotational speed n12. Since these rotational speeds n11, n12 are lower than the rotational speed n0 of the input shaft 1, the transmission suffers no overspeed problem.

The first clutch K1 may not be disengaged and the first ring gear, the second carrier C2, and the third ring gear R3 may be coupled together, so that the first, second, and third planetary gear trains G1, G2, G3 may be integrally combined together. In such a case, the first planetary gear train G1 overlaps the second and third gear trains G2, G3 as indicated by the two-dot-and-dash lines in FIG. 5. When the second brake B2 is disengaged and the first brake B1 is engaged to hold or fix the first ring gear R1, the second carrier C2, and the third ring gear R3 against rotation, the first carrier C1, i.e., the output gear 2, may rotate at the same rotational speed n1 as above, as indicated by the two-dot-and-dash line L1'', thereby obtaining the desired speed reduction ratio. However, the third sun gear S3 rotates at a rotational speed n13 which is higher than the rotational speed of the input shaft 1, resulting in an overspeed problem.

Figure 6:
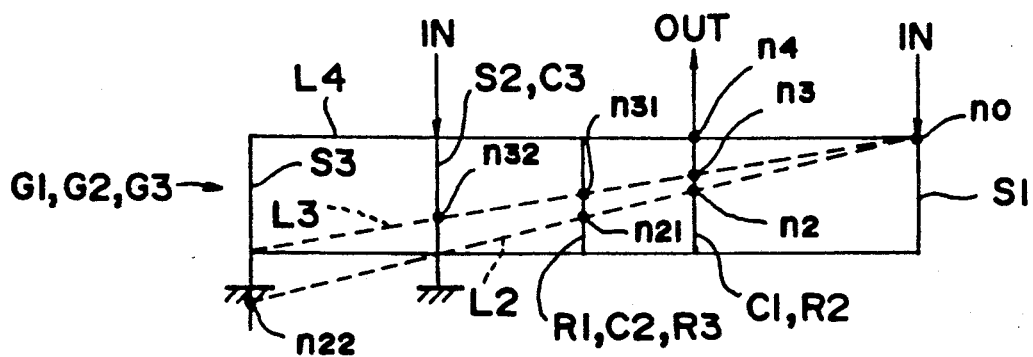

The rotational speeds of the output gear in the second through fourth gear positions or speed ranges will be described with reference to FIG. 6. In these speed ranges, the third clutch K3 (separating clutch) is engaged to couple the first ring gear R1, the second carrier C2, and the third ring gear R3 to each other. Therefore, all the first, second, and third planetary gear trains G1, G2, G3 are integrally combined with each other, as shown in FIG. 6.

In the second gear position, the second brake B2 remains engaged, holding the second sun gear S2 and the third carrier C3 against rotation. The first sun gear S1 rotates at the same rotational speed n0 as the rotational speed of the input shaft 1. Various elements rotate at rotational speeds indicated by points of intersection between the vertical lines indicating the elements and a dotted straight line L2 which interconnects the rotating condition of the first sun gear S1 and the fixed condition of the second sun gear S2 and the third carrier C3. Specifically, the output gear 2 rotates at a rotational speed n2 indicated by the point of intersection between the vertical line indicating the first carrier C1 and the second ring gear R2 and the dotted straight line L2. Similarly, the first ring gear R1, the second carrier C2, and the third ring gear R3 rotate at a rotational speed n21, and the third sun gear S3 rotates at a rotational speed n22. Since the rotational speeds of any elements are lower than the rotational speed n0 of the input shaft 1, the transmission does not suffer any overspeed problem in the second gear position.

In the third gear position, the second brake B2 is disengaged, and the third brake B3 is engaged, holding the third sun gear S3 against rotation. Various elements rotate at rotational speeds indicated by points of intersection between the vertical lines indicating the elements and a dotted straight line L3. Specifically, the output gear 2 rotates at a rotational speed n3 indicated by the point of intersection between the vertical line indicating the first carrier C1 and the second ring gear R2 and the dotted straight line L3. Similarly, the first ring gear R1, the second carrier C2, and the third ring gear R3 rotate at a rotational speed n31, and the second sun gear S2 and the third ring gear R3 rotates at a rotational speed n32. Since the rotational speeds of any elements are lower than the rotational speed n0 of the input shaft 1, the transmission does not suffer any overspeed problem in the third gear position.

In the fourth gear position, the third brake B3 is disengaged, and the second clutch K2 is engaged in addition to the third clutch K3. Therefore, the first, second, and third planetary gear trains G1, G2, G3 rotate in unison with the input shaft 1. The first sun gear S1, the second sun gear S2, and the third carrier C3 rotate at the same rotational speed n0 as that of the input shaft 1. The output gear 2 rotates at a rotational speed n4 (=n0) indicated by the point of intersection between the vertical line indicating the first carrier C1 and the second ring gear R2 and a horizontal solid straight line L4. Since the rotational speeds of all elements are the same as the rotational speed n0 of the input shaft 1, the transmission does not suffer any overspeed problem in the fourth gear position.

Figure 7:
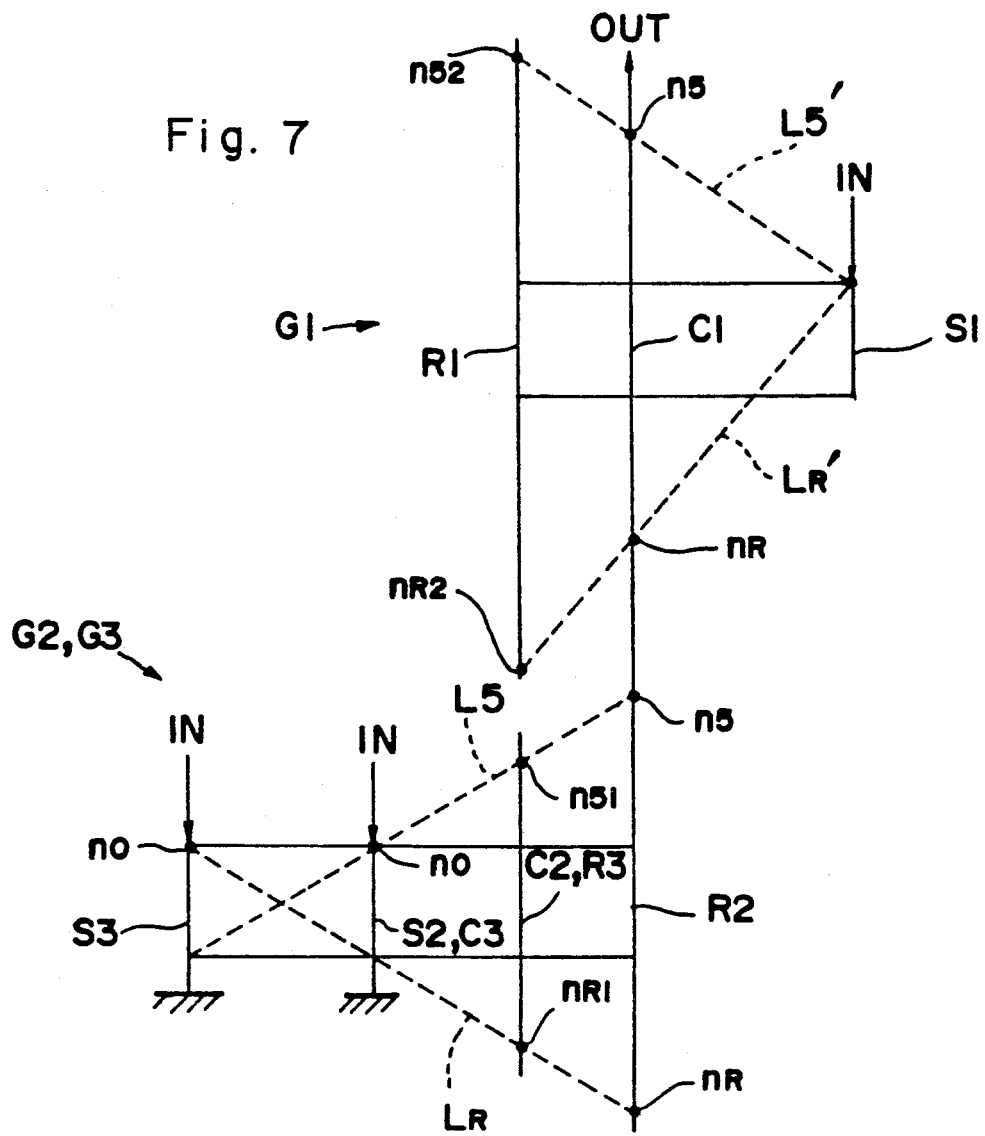

In the fifth gear position, the third clutch K3 is disengaged to separate the first planetary gear train G1 from the second and third planetary gear trains G2, G3. The rotational speeds of various elements are given as shown in FIG. 7. In the fifth gear position, the third brake B3 is engaged, holding the third sun gear S3 against rotation. The second clutch K2 remains engaged, allowing the second sun gear S2 and the third carrier C3 to rotate at the same rotational speed as that of the input shaft 1. Various elements rotate at rotational speeds indicated by points of intersection between the vertical lines indicating the elements and a dotted straight line L5. Specifically, the output gear 2 rotates at a rotational speed n5 indicated by the point of intersection between the vertical line indicating the second ring gear R2 and the dotted straight line L5. The second carrier C2 and the third ring gear R3 rotate at a rotational speed n51.

In the first planetary gear train G1, the first carrier C1 rotates at the rotational speed n5, and the first sun gear S1 coupled to the input shaft 1 rotates at the rotational speed n0. The first ring gear R1 rotates at a rotational speed n52 indicated by the point of intersection between the vertical line indicating the first ring gear R1 and a dotted straight line L5' which interconnects the point indicating the rotating condition of the first sun gear S1 and the point indicating the rotating condition of the first carrier C1. Although the rotational speed n52 is higher than the rotational speed n0 of the input shaft 1, since the automobile speed is high and the resistance to the running of the automobile is large while the automobile is running in the fifth gear position, the engine usually does not operate in a high speed range, and the first ring gear R1 suffers almost no overspeed problem. In the illustrated embodiment, the first sun gear S1 is directly coupled to the input shaft 1. However, the first sun gear S1 may be disengageably coupled to the input shaft 1 through a clutch, and the clutch may be disengaged in the fifth gear position, thereby solving any overspeed problem.

In the reverse gear position or REV range, the third clutch K3 is disengaged to separate the first planetary gear train G1 from the second and third planetary gear trains G2, G3. The rotational speeds of various elements are given as shown in FIG. 7. In the reverse gear position, the second brake B2 is engaged, holding the second sun gear S2 and the third carrier C3 against rotation. The first clutch K1 is engaged instead of the second clutch K2, so that the third sun gear S3 rotates at the same rotational speed as that of the input shaft 1. Various elements rotate at rotational speeds indicated by points of intersection between the vertical lines indicating the elements and a dotted straight line LR. Specifically, the output gear 2 rotates at a rotational speed nR (of a negative value) indicated by the point of intersection between the vertical line indicating the second ring gear R2 and the dotted straight line LR. The second carrier C2 and the third ring gear R3 rotate at a rotational speed nR1.

In the first planetary gear train G1, the first carrier C1 rotates at the rotational speed nR, and the first sun gear S1 coupled to the input shaft 1 rotates at the rotational speed n0. The first ring gear R1 rotates at a rotational speed nR2 indicated by the point of intersection between the vertical line indicating the first ring gear R1 and a dotted straight line LR' which interconnects the point indicating the rotating condition of the first sun gear S1 and the point indicating the rotating condition of the first carrier C1. The rotational speed nR2 is of a negative value, but its absolute value is higher than the rotational speed n0 of the input shaft 1. However, the first ring gear R1 suffers almost no overspeed problem since the engine is not operated in a fully throttled condition in the reverse gear position. The first sun gear S1 may be disengageably coupled to the input shaft 1 through a clutch, and the clutch may be disengaged in the fifth gear position, thereby solving any overspeed problem.

Type 2

Figures 8, 9:
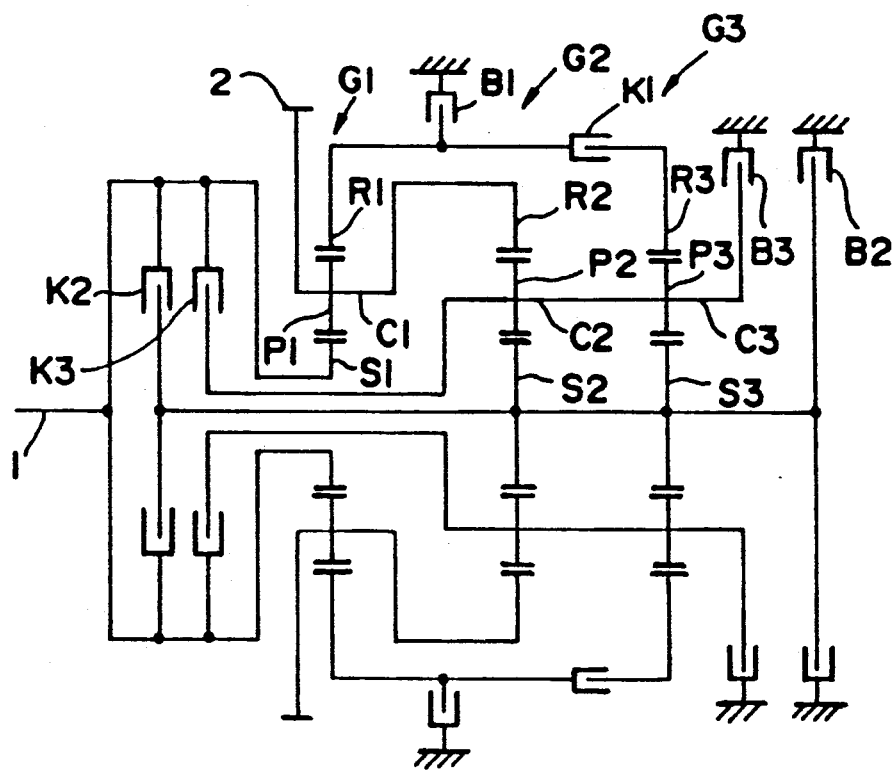
FIG. 8 is a skeleton diagram showing a planetary gear transmission according to another embodiment of the present invention.
FIG. 9 is a table showing the relationship between operation of clutches and brakes and gear ranges of the planetary gear transmission shown in FIG. 8.

The skeleton of a planetary gear transmission of type 2 is shown in FIG. 8. The planetary gear transmission shown in FIG. 8 has first, second, and third planetary gear trains G1, G2, G3 disposed coaxially with and parallel to each other. The planetary gear trains G1, G2, G3 have respective first, second, and third sun gears S1, S2, S3 positioned centrally, respective first, second, and third planetary pinions P1, P2, P3 meshing with the sun gears S1, S2, S3, respectively, and rotatable about their own axes while revolving around the sun gears S1, S2, S3, respective first, second, and third carriers C1, C2, C3 on which the respective planetary pinions P1, P2, P3 are rotatably supported and which are rotatable therewith around the sun gears S1, S2, S3, respectively, and respective first, second, and third ring gears R1, R2, R3 having internal gear teeth meshing with the planetary pinions P1, P2, P3, respectively.

The first sun gear S1 is directly coupled to an input shaft 1, and the first carrier C1 is directly coupled to the second ring gear R2 and an output gear 2. The first ring gear R1 is associated with a first brake B1 which can hold the first ring gear R1 against rotation. The first ring gear R1 is selectively engageable with and disengageable from the third ring gear R3 through a first clutch K1. The second and third sun gears S2, S3 are directly coupled to each other, and are disengageably coupled to the input shaft 1 through a second clutch K2. The second and third sun gears S2, S3 can be held against rotation by a second brake B2. The second and third carriers C2, C3 are directly coupled to each other, and are selectively engageable with and disengageable from the input shaft 1 through a third clutch K3, and can be held against rotation by a third brake B3.

The planetary gear elements including the first, second, third sun gears S1, S2, S3, the first, second, and third carriers C1, C2, C3, and the first, second, and third ring gears R1, R2, R3 are coupled between the input shaft 1 and the output gear 2 as described above. In the planetary gear transmission constructed as described above, gear positions can be established and gearshifts can be controlled by selectively engaging and disengaging the first, second, and third clutches K1, K2, K3 and the first, second, and third brakes B1, B2, B3. More specifically, five forward gear positions or speed ranges (LOW, 2ND, 3RD, 4TH, and 5TH) and one reverse gear position or range (REV) can be established by engaging and disengaging the clutches and the brakes as shown in FIG. 9.

As can be seen from the table of FIG. 9, each of the five forward gear positions or speed ranges (LOW through 5TH) can be established by engaging two of the clutches and the brakes (which will be referred to as engaging means). To effect a gearshift between two successive speed ranges, one of the two engaging means is disengaged and another engaging means is engaged, but the two engaging means are not required to be engaged or disengaged simultaneously. Therefore, the transmission can be controlled simply for gearshifts.

Figures 10, 11:
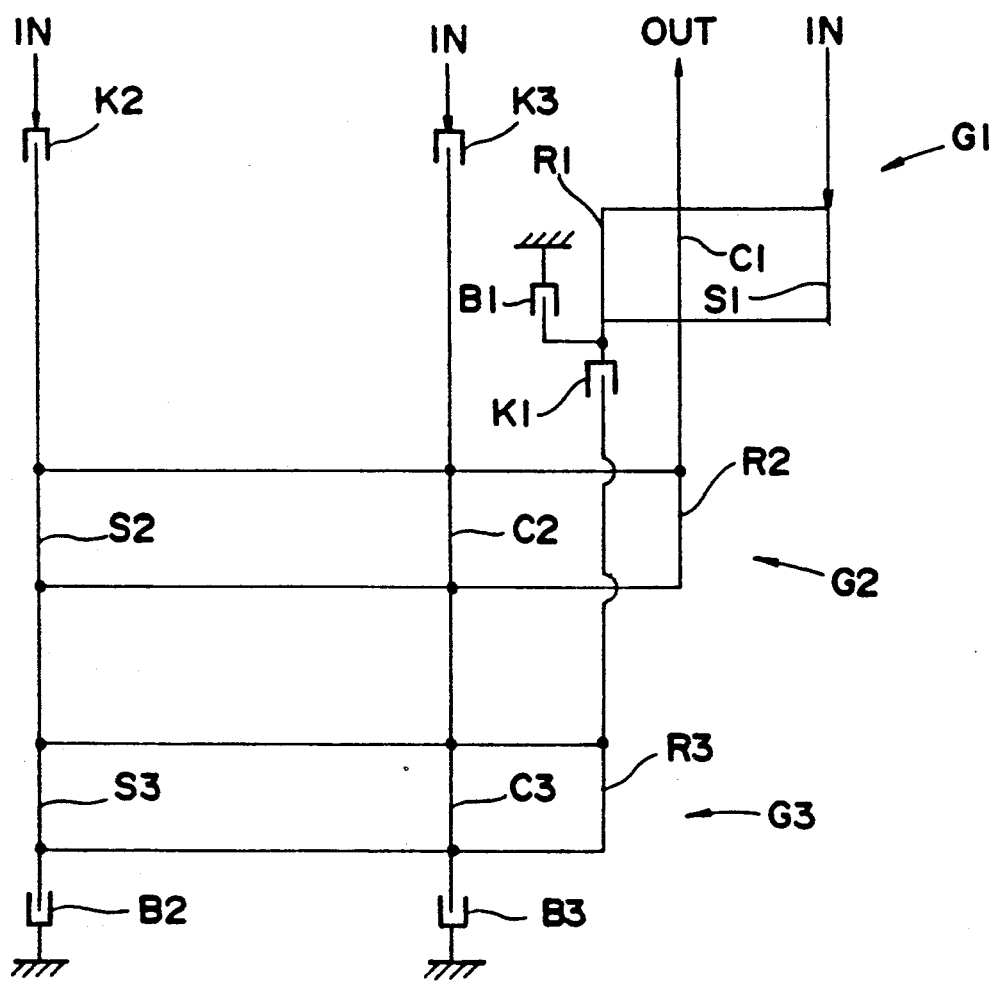
FIG. 10 is a table showing the coupling relationship between elements of planetary gear trains of the planetary gear transmission shown in FIG. 8.
FIGS. 11 through 14 are diagrams showing the speed relationship between the elements of the planetary gear trains of the planetary gear transmission shown in FIG. 8.

The coupling relationship between the elements (including the sun gears, the carriers, and the ring gears) of the planetary gear trains of the above planetary gear transmission is illustrated in FIG. 10. The second and third sun gears S2, S3 which are coupled to each other jointly serve as a first rotating member. The second carrier C2 and the third carrier C3 which are coupled to each other jointly serve as a second rotating member. The first ring gear R1 and the third ring gear R3 which are coupled together jointly serve as a third rotating member. The first carrier C1 and the second ring gear R2 which are coupled together jointly serve as a fourth rotating member. The first sun gear S1 singly serves as a fifth rotating member. As shown in FIG. 8, the first clutch K1 is disposed between the first ring gear R1 and the third ring ring R3, which serve as the third rotating member, and selectively connect and disconnect these elements.

The relationship between the speeds of the various elements of the type-2 transmission is shown in FIG. 11.

The rotational speeds of the output gear 2 corresponding to the rotational speeds of the input shaft 1 in the respective speed ranges will be determined using speed diagrams below.

Figure 12:
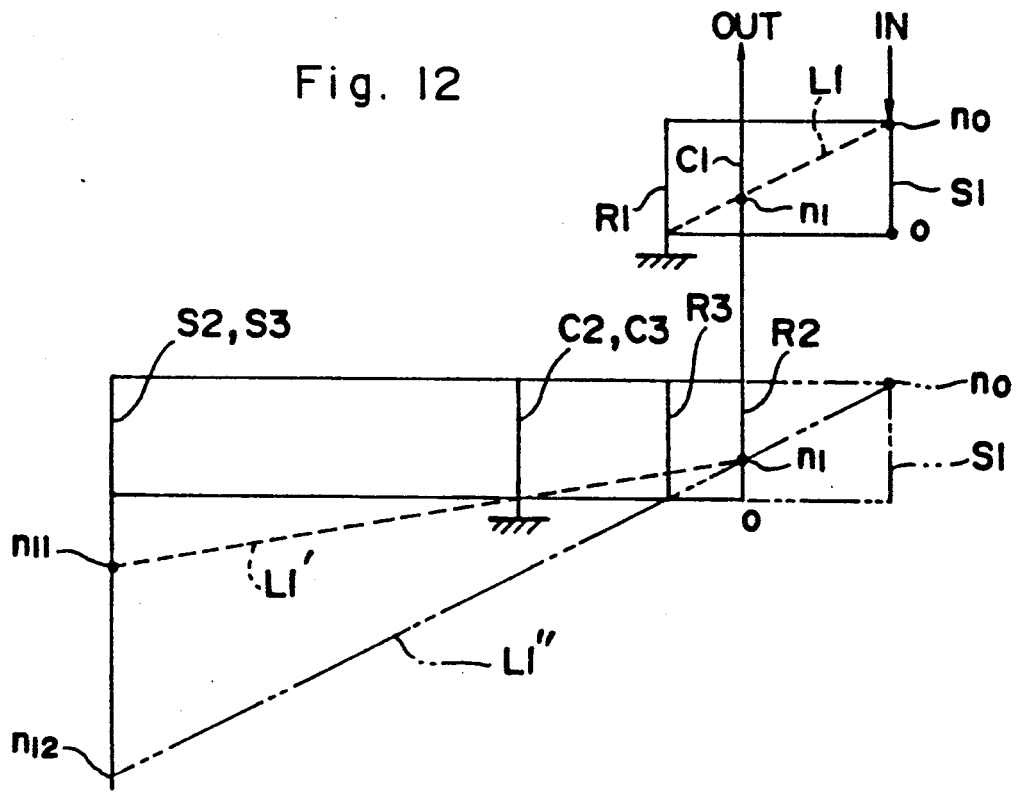

In the LOW range, all the clutches K1, K2, K3 and the second brake B2 are disengaged, and the first and third brakes B1, B3 are engaged. Since the two elements in each pair are mechanically coupled to each other in the second and third planetary gear trains G2, G3, the second and third planetary gear trains G2, G3 operate as an integral planetary gear whose speed diagram may be combined as shown in FIG. 12. Because the first clutch K1 is disengaged, the first planetary gear train G1 is separate from the integrally combined second and third planetary gear trains G2, G3, and only the first carrier C1 and the second ring gear R2 are coupled to each other.

If the rotational speed of the input shaft 1 is indicated by n0, then the rotational speed of the first sun gear S1 directly coupled to the input shaft 1 is also indicated by n0. Inasmuch as the first ring gear R1 is held or fixed against rotation by the first brake B1, the first carrier C1, i.e., the output gear 2, rotates at a rotational speed n1 which is indicated by a point of intersection between the vertical line indicating the first carrier C1 and a dotted straight line L1 (FIG. 12) that interconnects the point indicating the rotating condition of the first sun gear S1 and the point indicating the fixed condition of the first ring gear R1.

As the first carrier C1 is directly coupled to the second ring gear R2, the second ring gear R2 also rotates at the rotational speed n1. In the integrally combined second and third planetary gear trains G2, G3, the second carrier C2 and the third carrier C3 are held or fixed against rotation by the third brake B3. Consequently, a dotted straight line L1' is drawn between a point indicating the rotating condition of the second ring gear R2 at the rotational speed n1 and a point indicating the fixed condition of the second and third carriers C2, C3, and points of intersection with the dotted straight line L1' indicate the rotational speeds of other elements. The maximum rotational speed is the rotational speed n11 of the second and third sun gears S2, S3. Since the rotational speed n11 is lower than the rotational speed n0 of the input shaft 1, no overspeed problem is caused.

The first clutch K1 may not be disengaged and the first and third ring gears R1, R3 may be directly coupled to each other, so that the first, second, and third planetary gear trains G1, G2, G3 may be integrally combined together. In such a case, the first planetary gear train G1 overlaps the second and third gear trains G2, G3 as indicated by the two-dot-and-dash lines in FIG. 12. When the third brake B3 is disengaged and the first brake B1 is engaged to hold or fix the first and third ring gears R1, R3 against rotation, the first carrier C1, i.e., the output gear 2, may rotate at the same rotational speed n1 as above, as indicated by the two-dot-and-dash line L1'', thereby obtaining the desired speed reduction ratio. However, the second and third sun gears S2, S3 rotate at a rotational speed n12 which is higher than the rotational speed of the input shaft 1, resulting in an overspeed problem.

Figure 13:
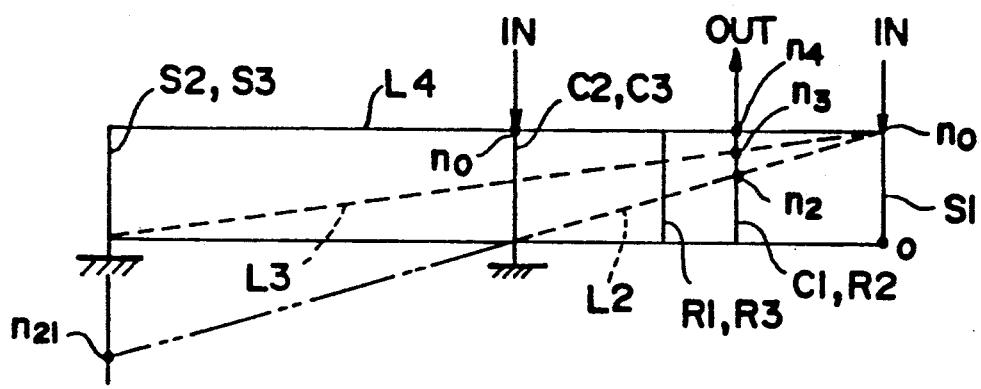

The rotational speeds of the output gear in the second through fourth gear positions or speed ranges will be described with reference to FIG. 13. In these speed ranges, the first clutch K1 is engaged and the first brake B1 is disengaged. Two elements (the first carrier C1 and the first ring gear R1) of the first planetary gear train G1 are directly coupled to elements of the second and third planetary gear trains G2, G3. Therefore, all the first, second, and third planetary gear trains G1, G2, G3 are integrally combined with each other, as shown in FIG. 13.

In the second gear position, the third brake B3 is engaged, holding the second and third carriers C2, C2 against rotation. The output gear 2 rotates at a rotational speed n2 indicated by the point of intersection between the vertical line indicating the first carrier C1 and a dotted straight line L2. A rotational speed n21 indicated by a point of intersection between an extension of the dotted straight line L2 and the vertical line indicating the second and third sun gears S2, S3 is maximum. However, since the rotational speed n21 is the same as or lower than the rotational speed n0 of the input shaft 1, no overspeed problem exists in the second gear position.

In the third gear position, the second brake B2 is engaged, holding the second and third sun gears S2, S3 against rotation. The output gear 2 rotates at a rotational speed n3 indicated by the point of intersection between the vertical line indicating the first carrier C1 and a dotted straight line L3. The rotational speeds of all elements are lower than the rotational speed n0 of the input shaft 1, and hence the transmission does not suffer any overspeed problem in the third gear position.

In the fourth gear position, the third clutch K3 is engaged in addition to the first clutch K1. Therefore, the first, second, and third planetary gear trains G1, G2, G3 rotate in unison with the input shaft 1. The first sun gear S1, the second and third carriers C2, C3 rotate at the same rotational speed n0 as that of the input shaft 1. The output gear 2 rotates at a rotational speed n4 indicated by the point of intersection between the vertical line indicating the first carrier C1 and a horizontal solid straight line L4. Since the rotational speeds of all elements are the same as the rotational speed n0 of the input shaft 1, the transmission does not suffer any overspeed problem in the fourth gear position.

Figure 14:
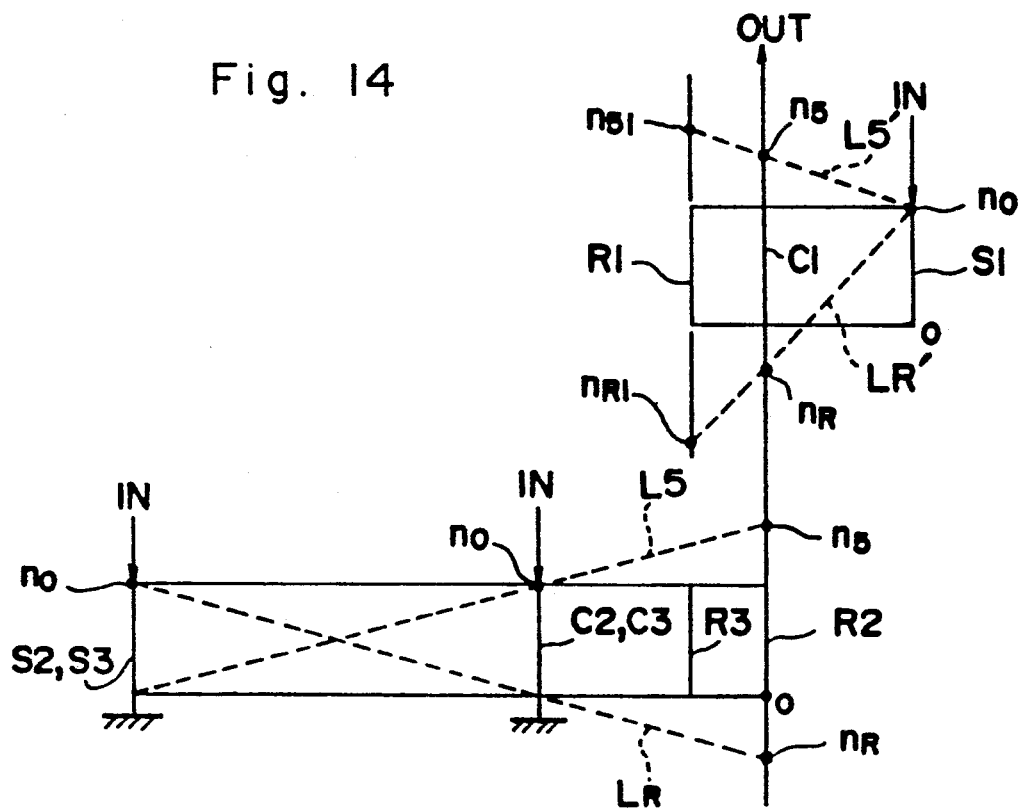

In the fifth gear position, the first clutch K1 and the first brake B1 are disengaged, releasing two elements (the first carrier C1 and the first ring gear R1) of the first planetary gear train G1, which is then made free. In the fifth gear position, the first planetary gear train G1 is shown as being separate from the second and third planetary gear trains G2, G3, as shown in FIG. 14. Only the first carrier C1 transmits the rotation to the output gear 2, and the other elements are not involved in the transmission of the rotation. In the fifth gear position, the second brake B2 is engaged, holding the second and third sun gears S2, S3 against rotation. The third clutch K3 is engaged, allowing the second and third carriers C2, C3 to rotate with the input shaft 1. The output gear 2 rotates at a rotational speed n5 indicated by the point of intersection between the vertical line indicating the second ring gear R2 (and the first carrier C1) directly coupled to the output gear 2 and a dotted straight line L5 in FIG. 14. The rotation is transmitted through the first carrier C1 to the output gear 2.

In the first planetary gear train G1, the first carrier C1 rotates at the rotational speed n5, and the first sun gear S1 directly coupled to the input shaft 1 rotates at the rotational speed n0. The first ring gear R1 rotates at a rotational speed n51 indicated by the point of intersection between the vertical line indicating the first ring gear R1 and a dotted straight line L5'. Although the rotational speed n51 is higher than the rotational speed n0 of the input shaft 1, since the automobile speed is high and the resistance to the running of the automobile is large while the automobile is running in the fifth gear position, the engine usually does not operate in a high speed range, and the first ring gear R1 suffers almost no overspeed problem.

In the reverse gear position or REV range, the first clutch K1 and the first brake B1 are disengaged to release the first planetary gear train G1. The rotational speeds of various elements are given as shown in FIG. 14. In the reverse gear position, the third brake B3 is engaged, holding the second and third carriers C2, C3 against rotation. The second clutch K2 is engaged to allow the second and third sun gears S2, S3 to rotate with the input shaft 1. The output gear 2 rotates at a rotational speed nR (of a negative value) indicated by the point of intersection between the vertical line indicating the second ring gear R2 and a dotted straight line LR.

In the first planetary gear train G1, the first carrier C1 rotates at the rotational speed nR, and the first sun gear S1 directly coupled to the input shaft 1 rotates at the rotational speed n0. The first ring gear R1 rotates at a rotational speed nR1 indicated by the point of intersection between the vertical line indicating the first ring gear R1 and a dotted straight line LR'. The first ring gear R1 rotates in a reverse direction, and the absolute value of the rotational speed nR1 is substantially the same as the rotational speed n0. The first ring gear R1 suffers almost no overspeed problem since the engine is not operated in a fully throttled condition in the reverse gear position.

Type 3

Figures 15, 16:
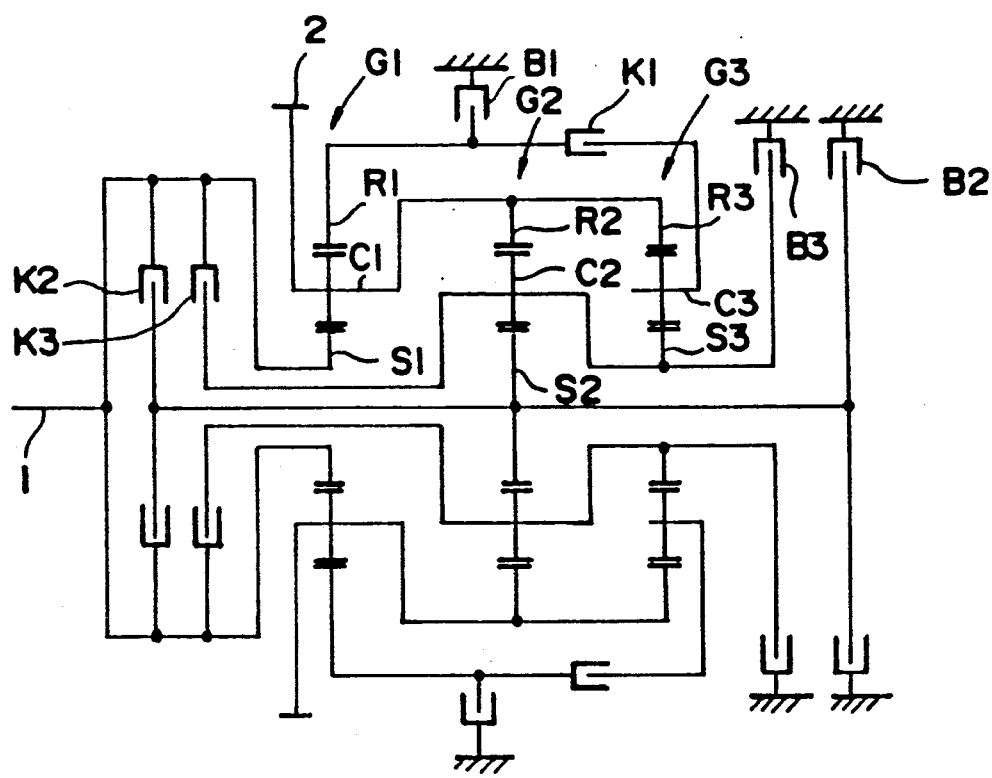
FIG. 15 is a skeleton diagram showing a planetary gear transmission according to still another embodiment of the present invention.
FIG. 16 is a table showing the relationship between operation of clutches and brakes and gear ranges of the planetary gear transmission shown in FIG. 15.

The skeleton of a planetary gear transmission of type 3 is shown in FIG. 15. The planetary gear transmission shown in FIG. 15 has first, second, and third planetary gear trains G1, G2, G3 disposed coaxially with and parallel to each other. The planetary gear trains G1, G2, G3 have respective first, second, and third sun gears S1, S2, S3, respective first, second, and third carriers C1, C2, C3, and respective first, second, and third ring gears R1, R2, R3.

The first sun gear S1 is directly coupled to an input shaft 1, and the first carrier C1 is directly coupled to the second and third ring gears R2, R3 and an output gear 2. The first ring gear R1 is associated with a first brake B1 which can hold the first ring gear R1 against rotation. The first ring gear R1 is selectively engageable with and disengageable from the third carrier C3 through a first clutch K1. The second sun gear S2 is disengageably coupled to the input shaft 1 through a second clutch K2. The second sun gear S2 can be held against rotation by a second brake B2. The second carrier C2 and the third sun gear S3 are directly coupled to each other, and are selectively engageable with and disengageable from the input shaft 1 through a third clutch K3. The second carrier C2 and the third sun gear S3 can be held against rotation by a third brake B3.

In the planetary gear transmission constructed as described above, gear positions can be established and gearshifts can be controlled by selectively engaging and disengaging the first, second, and third clutches K1, K2, K3 and the first, second, and third brakes B1, B2, B3. More specifically, five forward gear positions or speed ranges (LOW, 2ND, 3RD, 4TH, and 5TH) and one reverse gear position or range (REV) can be established by engaging and disengaging the clutches and the brakes as shown in FIG. 16. In FIG. 16, those clutches and brakes which are indicated by a circle are engaged. Speed reduction ratios of the transmission in the respective speed ranges are given only by way of example in FIG. 16.

To effect a gearshift between two successive speed ranges, one of the two engaging means is disengaged and another engaging means is engaged, but the two engaging means are not required to be engaged or disengaged simultaneously. Therefore, the transmission can be controlled simply for gearshifts.

Figures 17, 18:
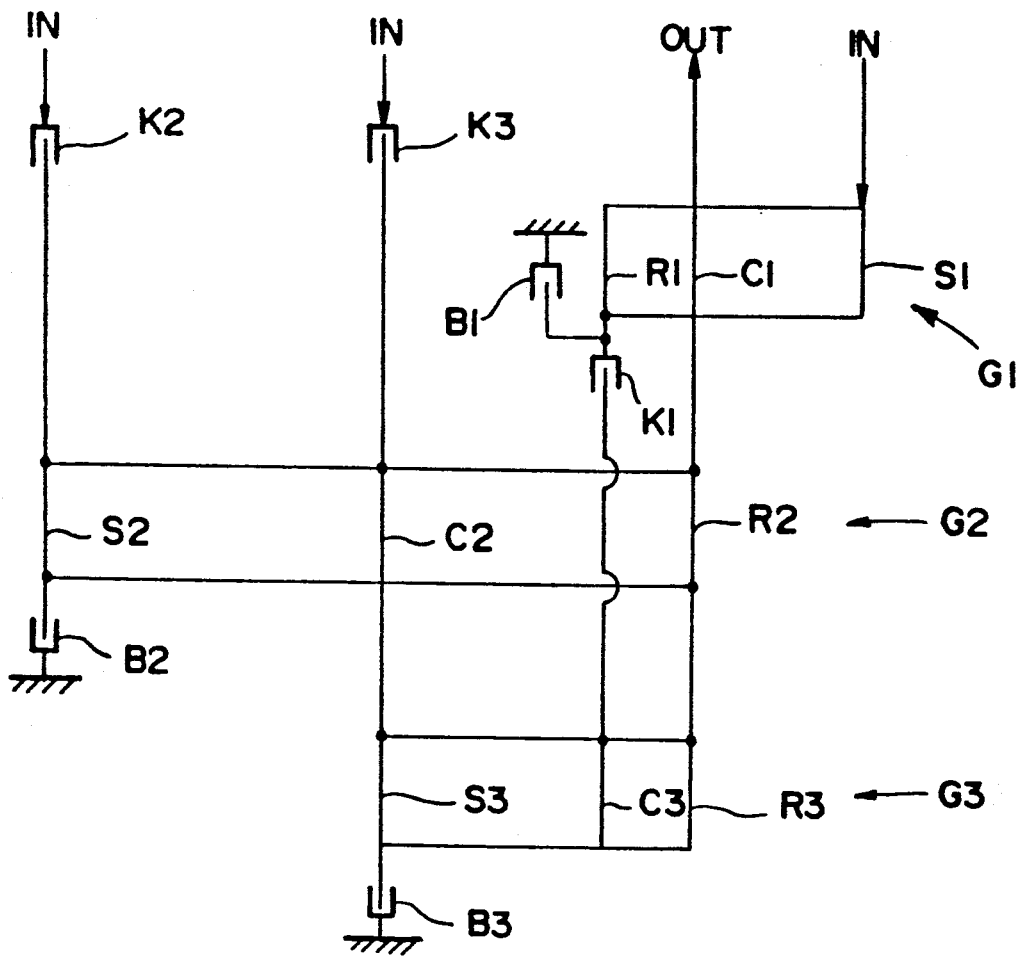
FIG. 17 is a table showing the coupling relationship between elements of planetary gear trains of the planetary gear transmission shown in FIG. 15.
FIGS. 18 through 21 are diagrams showing the speed relationship between the elements of the planetary gear trains of the planetary gear transmission shown in FIG. 15.

The coupling relationship between the elements (including the sun gears, the carriers, and the ring gears) of the planetary gear trains of the above planetary gear transmission is illustrated in FIG. 17. The second sun gear S2 singly serves as a first rotating member. The second carrier C2 and the third sun gear S3 which are coupled to each other jointly serve as a second rotating member. The first ring gear R1 and the third carrier C3 which are coupled together jointly serve as a third rotating member. The first carrier C1, the second ring gear R2, and the third ring gear R3 which are coupled together jointly serve as a fourth rotating member. The first sun gear S1 singly serves as a fifth rotating member. As shown in FIG. 15, the third clutch K3 is disposed between the first ring gear R1 and the third carrier C3, which serve as the third rotating member, and selectively connect and disconnect these elements.

The relationship between the speeds of the various elements of the type-3 transmission is shown in FIG. 18. Speed reduction ratios in the speed ranges of the transmission will be described below with reference to FIG. 18.

Figure 19:
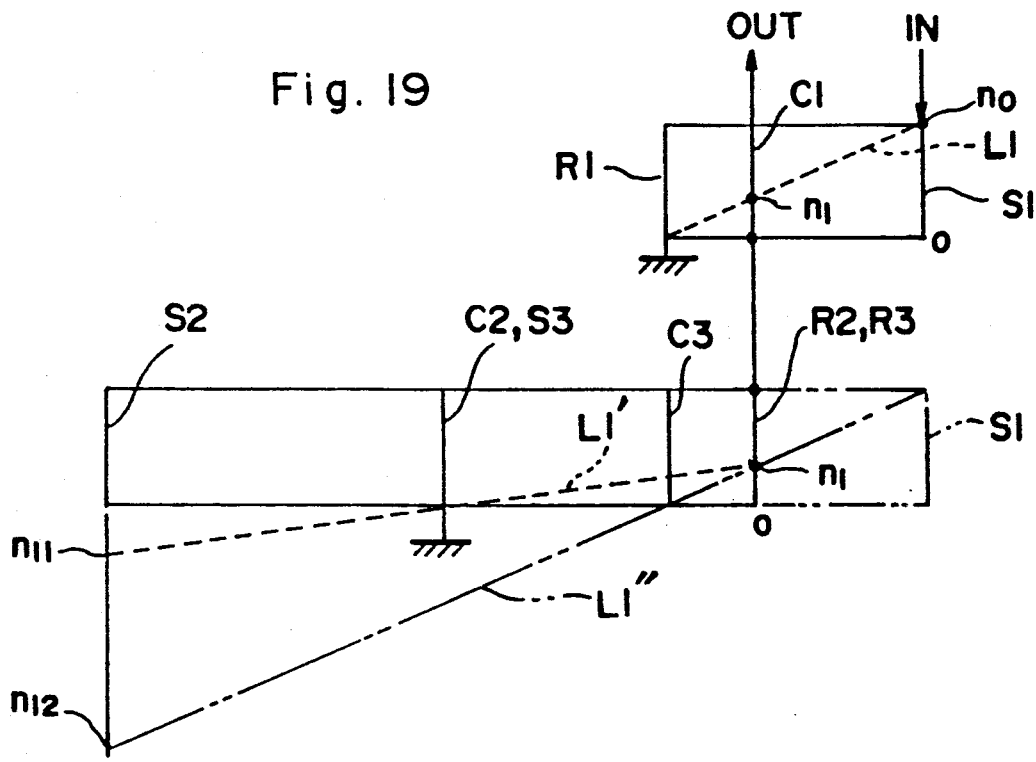

In the LOW range, all the clutches K1, K2, K3 and the second brake B2 are disengaged, and the first and third brakes B1, B3 are engaged. Since the two elements in each pair are mechanically coupled to each other in the second and third planetary gear trains G2, G3, the second and third planetary gear trains G2, G3 operate as an integral planetary gear whose speed diagram may be combined as shown in FIG. 19. Because the first clutch K1 is disengaged, the first planetary gear train G1 is separate from the integrally combined second and third planetary gear trains G2, G3, and only the first carrier C1 and the second ring gear R2 are coupled to each other.

The first sun gear S1 directly coupled to the input shaft 1 rotates at the same rotational speed n0 as that of the input shaft 1. Inasmuch as the first ring gear R1 is held or fixed against rotation by the first brake B1, the first carrier C1, i.e., the output gear 2, rotates at a rotational speed n1 which is indicated by a point of intersection between the vertical line indicating the first carrier C1 and a dotted straight line L1 (FIG. 19).

As the first carrier C1 is directly coupled to the second and third ring gears R2, R3, the second and third ring gears R2, R3 also rotate at the rotational speed n1. In the integrally combined second and third planetary gear trains G2, G3, the second carrier C2 and the third sun gear S3 are held or fixed against rotation by the third brake B3. Consequently, a dotted straight line L1′ is drawn between a point indicating the rotating condition of the second and third ring gears R2, R3 at the rotational speed n1 and a point indicating the fixed condition of the second carrier C2 and the third sun gear S3, and points of intersection with the dotted straight line L1′ indicate the rotational speeds of other elements. The maximum rotational speed is the rotational speed n11 of the second sun gear S2. Since the rotational speed n11 is lower than the rotational speed n0 of the input shaft 1, no overspeed problem is caused.

The first clutch K1 may not be disengaged and the first ring gear R1 and the third carrier C3 may be coupled to each other, so that the first, second, and third planetary gear trains G1, G2, G3 may be integrally combined together. In such a case, when the third brake B3 is disengaged and the first brake B1 is engaged to hold or fix the first ring gear R1 and the third carrier C3 against rotation, the first carrier C1 may rotate at the same rotational speed n1 as above, as indicated by a two-dot-and-dash line L1″, thereby obtaining the desired speed reduction ratio. However, the second sun gear S2 rotates at a rotational speed n12 which is higher than the rotational speed of the input shaft 1, resulting in an overspeed problem.

Figure 20:
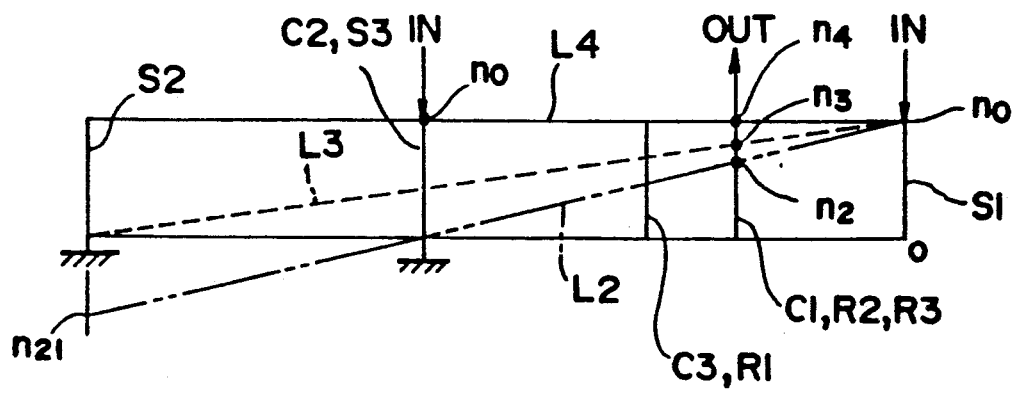

The rotational speeds of the output gear in the second through fourth gear positions or speed ranges will be described with reference to FIG. 20. In these speed ranges, the first clutch K1 is engaged and the first brake B1 is disengaged. Two elements (the first carrier C1 and the first ring gear R1) of the first planetary gear train G1 are directly coupled to elements of the second and third planetary gear trains G2, G3. Therefore, all the first, second, and third planetary gear trains G1, G2, G3 are integrally combined with each other, as shown in FIG. 20.

In the second gear position, the third brake B3 is engaged, holding the second carrier C2 and the third sun gear S3 against rotation. The output gear 2 rotates at a rotational speed n2 indicated by the point of intersection between the vertical line indicating the first carrier C1 and a dotted straight line L2. A rotational speed n21 indicated by a point of intersection between an extension of the dotted straight line L2 and the vertical line indicating the second sun gear S2 is maximum. However, since the rotational speed n21 is the same as or lower than the rotational speed n0 of the input shaft 1, no overspeed problem exists in the second gear position.

In the third gear position, the second brake B2 is engaged, holding the second sun gear S2 against rotation. The output gear 2 rotates at a rotational speed n3 indicated by the point of intersection between the vertical line indicating the first carrier C1 and a dotted straight line L3. The rotational speeds of all elements are lower than the rotational speed n0 of the input shaft 1, and hence the transmission does not suffer any overspeed problem in the third gear position.

In the fourth gear position, the third clutch K3 is engaged in addition to the first clutch K1. Therefore, the first, second, and third planetary gear trains G1, G2, G3 rotate in unison with the input shaft 1. The first sun gear S1, the second carrier C2, and the third sun gear S3 rotate at the same rotational speed n0 as that of the input shaft 1. The output gear 2 rotates at a rotational speed n4 indicated by the point of intersection between the vertical line indicating the first carrier C1 and a horizontal solid straight line L4. Since the rotational speeds of all elements are the same as the rotational speed n0 of the input shaft 1, the transmission does not suffer any overspeed problem in the fourth gear position.

Figure 21:
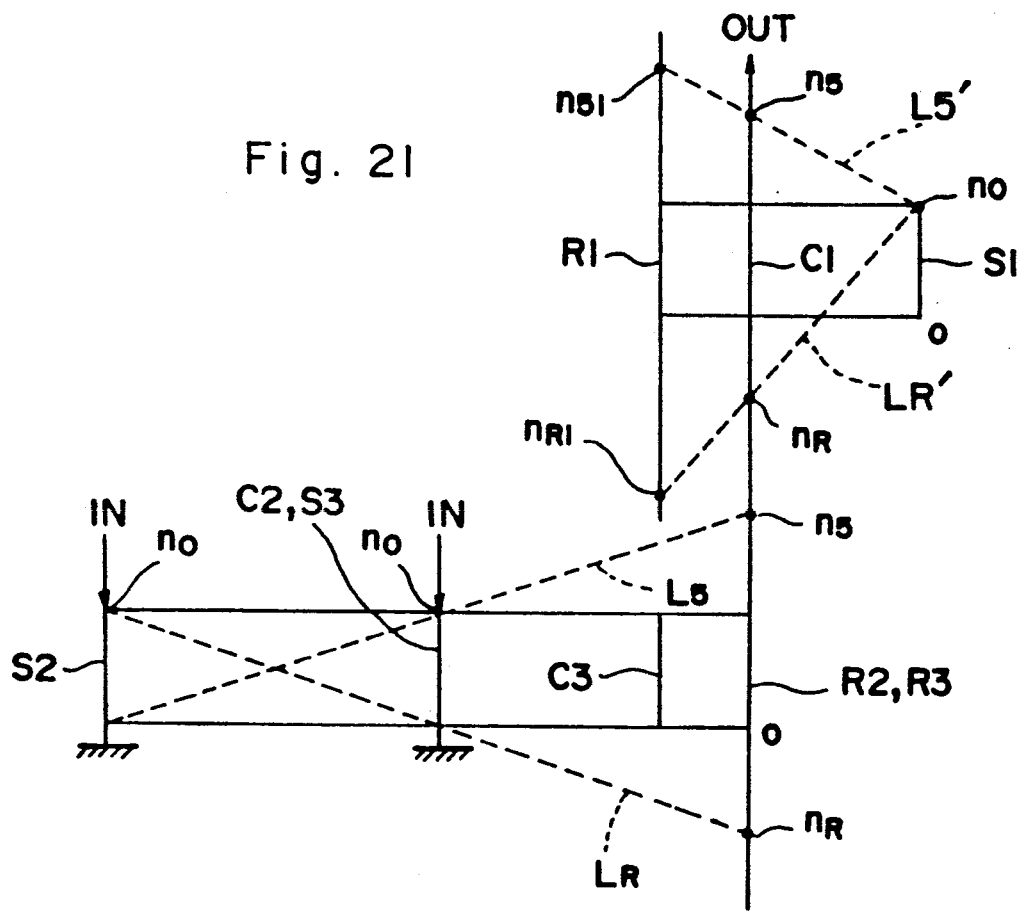

In the fifth gear position, the first clutch K1 and the first brake B1 are disengaged, releasing two elements (the first carrier C1 and the first ring gear R1) of the first planetary gear train G1, which is then made free. The first planetary gear train G1 is shown as being separate from the second and third planetary gear trains G2, G3, as shown in FIG. 21. In the fifth gear position, the second brake B2 is engaged, holding the second sun gear S2 against rotation. The third clutch K3 is engaged, allowing the second carrier C2 and the third sun gear S3 to rotate with the input shaft 1. The output gear 2 rotates at a rotational speed n5 indicated by the point of intersection between the vertical line indicating the second and third ring gears R2, R3 (and the first carrier C1) directly coupled to the output gear 2 and a dotted straight line L5 in FIG. 21. The rotation is transmitted through the first carrier C1 to the output gear 2.

In the first planetary gear train G1, the first carrier C1 rotates at the rotational speed n5, and the first sun gear S1 directly coupled to the input shaft 1 rotates at the rotational speed n0. The first ring gear R1 rotates at a rotational speed n51 indicated by the point of intersection between the vertical line indicating the first ring gear R1 and a dotted straight line L5'. Although the rotational speed n51 is higher than the rotational speed n0 of the input shaft 1, since the automobile speed is high and the resistance to the running of the automobile is large while the automobile is running in the fifth gear position, the engine usually does not operate in a high speed range, and the first ring gear R1 suffers almost no overspeed problem.

In the reverse gear position or REV range, the first clutch K1 and the first brake B1 are disengaged to release the first planetary gear train G1. The rotational speeds of various elements are given as shown in FIG. 21. In the reverse gear position, the third brake B3 is engaged, holding the second carrier C2 and the third sun gear S3 against rotation. The second clutch K2 is engaged to allow the second sun gear S2 to rotate with the input shaft 1. The output gear 2 rotates at a rotational speed nR (of a negative value) indicated by the point of intersection between the vertical line indicating the second and third ring gears R2, R3 (and the first carrier C1) and a dotted straight line LR.

In the first planetary gear train G1, the first carrier C1 rotates at the rotational speed nR, and the first sun gear S1 directly coupled to the input shaft 1 rotates at the rotational speed n0. The first ring gear R1 rotates at a rotational speed nR1 indicated by the point of intersection between the vertical line indicating the first ring gear R1 and a dotted straight line LR'. The first ring gear R1 rotates in a reverse direction, and the absolute value of the rotational speed nR1 is larger than the rotational speed n0. The first ring gear R1 suffers almost no overspeed problem since the engine is not operated in a fully throttled condition in the reverse gear position.

Type 4

Figures 22, 23:
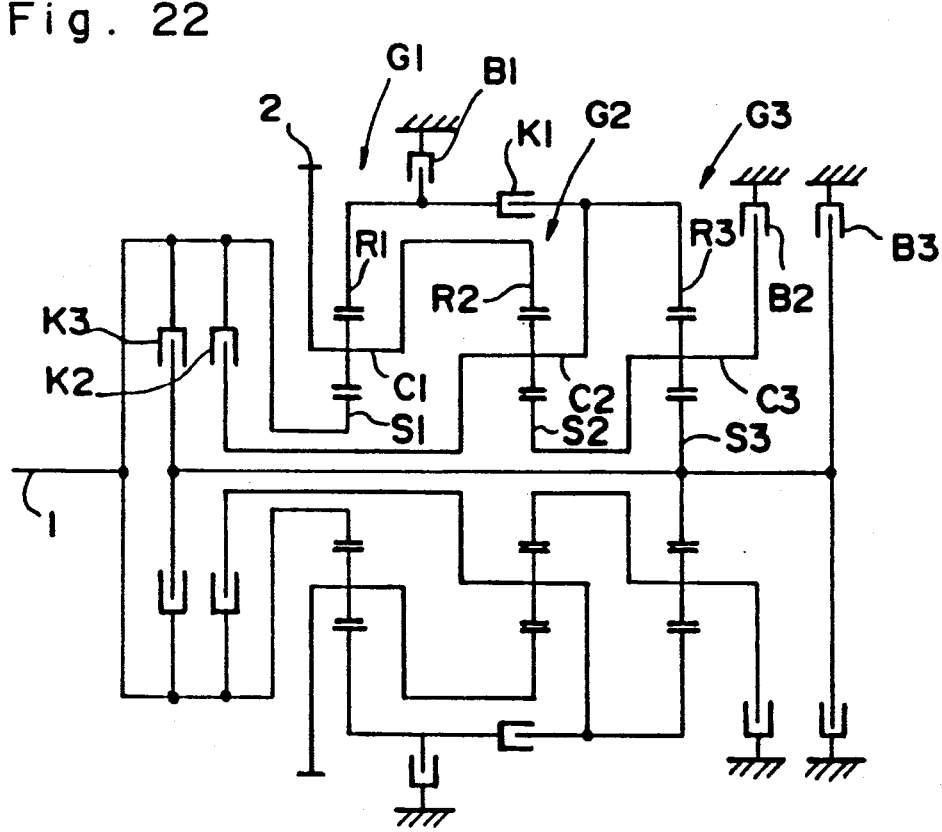
FIG. 22 is a skeleton diagram showing a planetary gear transmission according to yet another embodiment of the present invention.
FIG. 23 is a table showing the relationship between operation of clutches and brakes and gear ranges of the planetary gear transmission shown in FIG. 22.

The skeleton of a planetary gear transmission of type 4 is shown in FIG. 22. The planetary gear transmission shown in FIG. 22 has first, second, and third planetary gear trains G1, G2, G3 disposed coaxially with and parallel to each other. The planetary gear trains G1, G2, G3 have respective first, second, and third sun gears S1, S2, S3, respective first, second, and third carriers C1, C2, C3, and respective first, second, and third ring gears R1, R2, R3.

The first sun gear S1 is directly coupled to an input shaft 1, and the first carrier C1 is directly coupled to the second ring gear R2 and an output gear 2. The first ring gear R1 is associated with a first brake B1 which can hold the first ring gear R1 against rotation. The first ring gear R1 is selectively engageable with and disengageable from the third ring gear R3 through a first clutch K1. The second sun gear S2 is coupled to the third carrier C3, which can be held against rotation by a second brake B2. The second carrier C2 and the third ring gear R3 are coupled to each other, and are selectively engageable with and disengageable from the input shaft 1 through a second clutch K2. The sun gear S3 is associated with the third brake B3, and disengageably coupled to the input shaft 1 through a third clutch K3.

In the planetary gear transmission constructed as described above, gear positions can be established and gearshifts can be controlled by selectively engaging and disengaging the first, second, and third clutches K1, K2, K3 and the first, second, and third brakes B1, B2, B3. More specifically, five forward gear positions or speed ranges (LOW, 2ND, 3RD, 4TH, and 5TH) and one reverse gear position or range (REV) can be established by engaging and disengaging the clutches and the brakes as shown in FIG. 23. In FIG. 23, those clutches and brakes which are indicated by a circle are engaged. Speed reduction ratios of the transmission in the respective speed ranges are given only by way of example in FIG. 23.

To effect a gearshift between two successive speed ranges, one of the two engaging means is disengaged and another engaging means is engaged, but the two engaging means are not required to be engaged or disengaged simultaneously. Therefore, the transmission can be controlled simply for gearshifts.

Figures 24, 25:
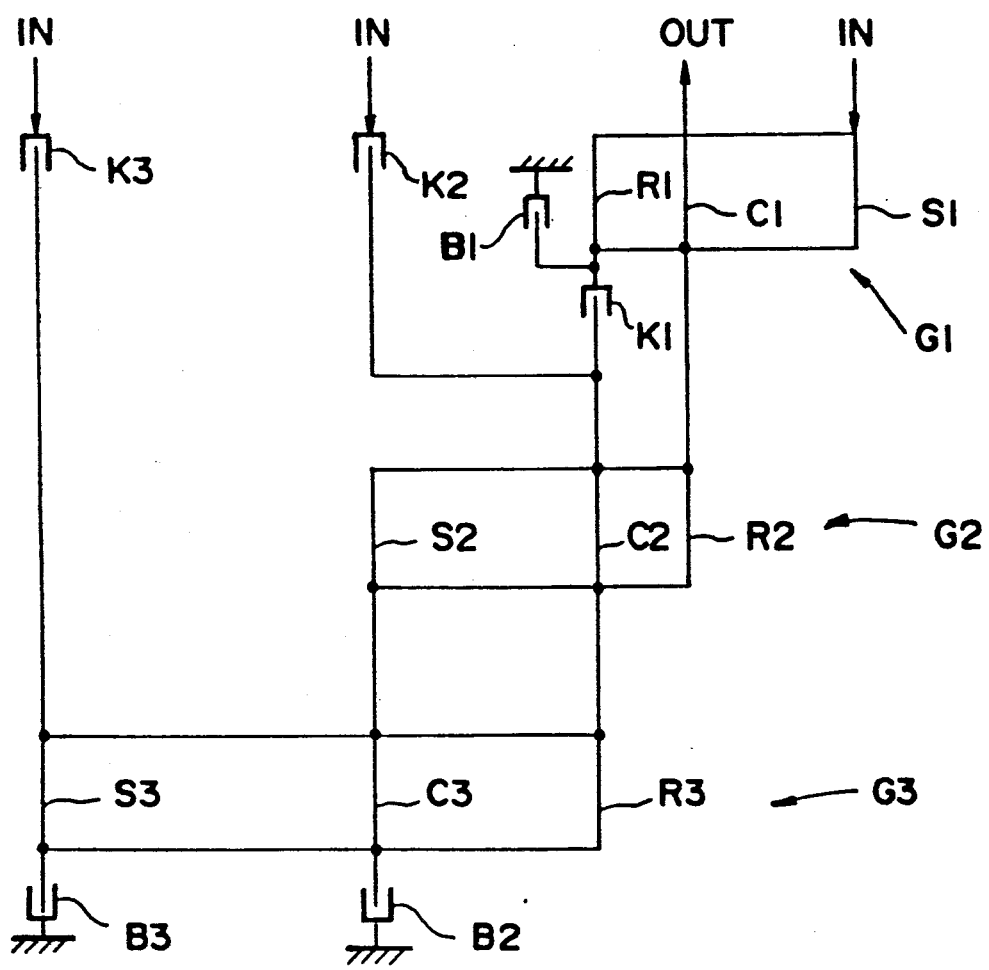
FIG. 24 is a table showing the coupling relationship between elements of planetary gear trains of the planetary gear transmission shown in FIG. 22.
FIGS. 25 through 28 are diagrams showing the speed relationship between the elements of the planetary gear trains of the planetary gear transmission shown in FIG. 22.

The coupling relationship between the elements (including the sun gears, the carriers, and the ring gears) of the planetary gear trains of the above planetary gear transmission is illustrated in FIG. 24. The third sun gear S3 singly serves as a first rotating member. The second sun gear S2 and the third carrier C3 which are coupled to each other jointly serve as a second rotating member. The first ring gear R1, the second carrier C2, and the third ring gear R3 which are coupled together jointly serve as a third rotating member. The first carrier C1 and the second ring gear R2 which are coupled together jointly serve as a fourth rotating member. The first sun gear S1 singly serves as a fifth rotating member. As shown in FIG. 22, the third clutch K3 is disposed between the first ring gear R1, and the second carrier C2 and the third ring gear R3, which serve as the third rotating member, and selectively connect and disconnect these elements.

The relationship between the speeds of the various elements of the type-4 transmission is shown in FIG. 25. Speed reduction ratios in the speed ranges of the transmission will be described below with reference to FIG. 25.

Figure 26:
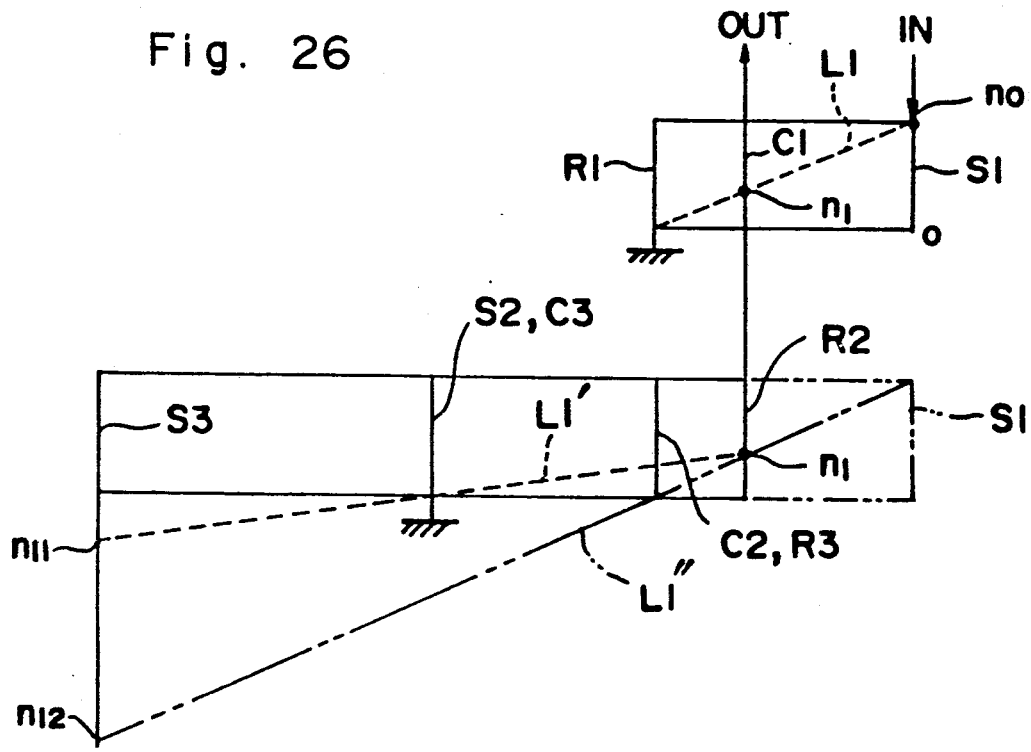

In the LOW range, all the clutches K1, K2, K3 and the third brake B3 are disengaged, and the first and second brakes B1, B2 are engaged. Since the two elements in each pair are mechanically coupled to each other in the second and third planetary gear trains G2, G3, the second and third planetary gear trains G2, G3 operate as an integral planetary gear whose speed diagram may be combined as shown in FIG. 26. Because the first clutch K1 is disengaged, the first planetary gear train G1 is separate from the integrally combined second and third planetary gear trains G2, G3, and only the first carrier C1 and the second ring gear R2 are coupled to each other.

The first sun gear S1 directly coupled to the input shaft 1 rotates at the same rotational speed n0 as that of the input shaft 1. Inasmuch as the first ring gear R1 is held or fixed against rotation by the first brake B1, the first carrier C1, i.e., the output gear 2, rotates at a rotational speed n1 which is indicated by a point of intersection between the vertical line indicating the first carrier C1 and a dotted straight line L1 (FIG. 26).

As the first carrier C1 is directly coupled to the second ring gear R2, the second ring gear R2 also rotates at the rotational speed n1. In the integrally combined second and third planetary gear trains G2, G3, the second sun gear S2 and the third carrier C3 are held or fixed against rotation by the second brake B2. Consequently, a dotted straight line L1' is drawn between a point indicating the rotating condition of the second ring gear R2 at the rotational speed n1 and a point indicating the fixed condition of the second sun gear S2 and the third carrier C3, and points of intersection with the dotted straight line L1' indicate the rotational speeds of other elements. The maximum rotational speed is the rotational speed n11 of the third sun gear S3. Since the rotational speed n11 is lower than the rotational speed n0 of the input shaft 1, no overspeed problem is caused.

The first clutch K1 may not be disengaged and the first ring gear R1, the second carrier C2, and the third ring gear R3 may be directly coupled to each other, so that the first, second, and third planetary gear trains G1, G2, G3 may be integrally combined together. In such a case, when the second brake B2 is disengaged and the first brake B1 is engaged to hold or fix the first ring gear R1, the second carrier C2, and the third ring gear R3 against rotation, the first carrier C1 may rotate at the same rotational speed n1 as above, as indicated by a two-dot-and-dash line L1'', thereby obtaining the desired speed reduction ratio. However, the third sun gear S3 rotates at a rotational speed n12 which is higher than the rotational speed of the input shaft 1, resulting in an overspeed problem.

Figure 27:
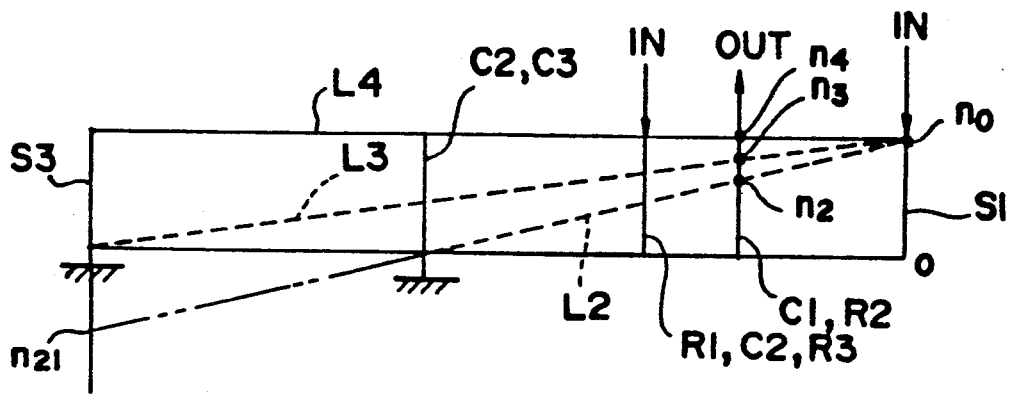

The rotational speeds of the output gear in the second through fourth gear positions or speed ranges will be described with reference to FIG. 27. In these speed ranges, the first clutch K1 is engaged and the first brake B1 is disengaged. Two elements (the first carrier C1 and the first ring gear R1) of the first planetary gear train G1 are directly coupled to elements of the second and third planetary gear trains G2, G3. Therefore, all the first, second, and third planetary gear trains G1, G2, G3 are integrally combined with each other, as shown in FIG. 27.

In the second gear position, the second brake B2 is engaged, holding the second sun gear S2 and the third carrier C3 against rotation. The output gear 2 rotates at a rotational speed n2 indicated by the point of intersection between the vertical line indicating the first carrier C1 and a dotted straight line L2. A rotational speed n21 indicated by a point of intersection between an extension of the dotted straight line L2 and the vertical line indicating the third sun gear S3 is maximum. However, since the rotational speed n21 is the same as or lower than the rotational speed n0 of the input shaft 1, no overspeed problem exists in the second gear position.

In the third gear position, the third brake B3 is engaged, holding the third sun gear S3 against rotation. The output gear 2 rotates at a rotational speed n3 indicated by the point of intersection between the vertical line indicating the first carrier C1 and a dotted straight line L3. The rotational speeds of all elements are lower than the rotational speed n0 of the input shaft 1, and hence the transmission does not suffer any overspeed problem in the third gear position.

In the fourth gear position, the second clutch K2 is engaged in addition to the first clutch K1. Therefore, the first, second, and third planetary gear trains G1, G2, G3 rotate in unison with the input shaft 1. The first sun gear S1 and the first ring gear R1, and the second carrier C2 and the third ring gear R3 rotate at the same rotational speed n0 as that of the input shaft 1. The output gear 2 rotates at a rotational speed n4 indicated by the point of intersection between the vertical line indicating the first carrier C1 and a horizontal solid straight line L4. Since the rotational speeds of all elements are the same as the rotational speed n0 of the input shaft 1, the transmission does not suffer any overspeed problem in the fourth gear position.

Figure 28:
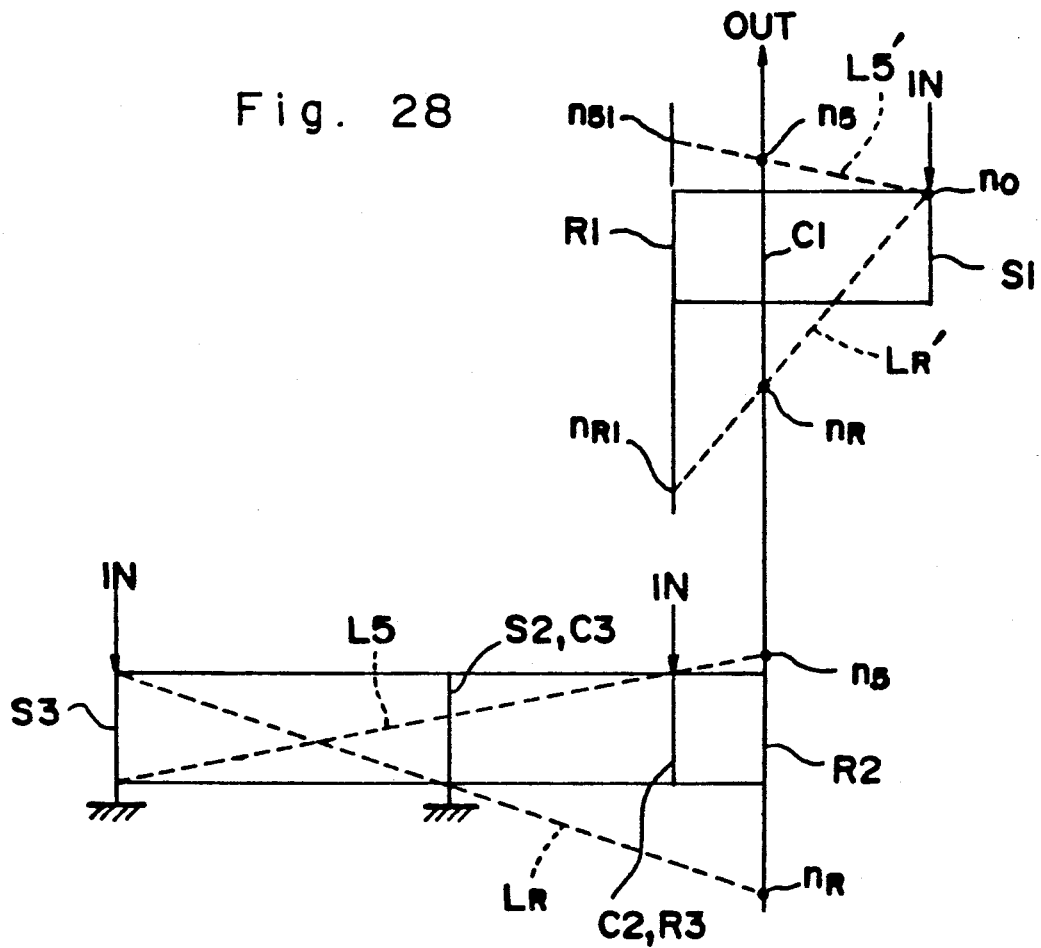

In the fifth gear position, the first clutch K1 and the first brake B1 are disengaged, releasing two elements (the first carrier C1 and the first ring gear R1) of the first planetary gear train G1, which is then made free. The first planetary gear train G1 is shown as being separate from the second and third planetary gear trains G2, G3, as shown in FIG. 28. In the fifth gear position, the third brake B3 is engaged, holding the third sun gear S3 against rotation. The second clutch K2 is engaged, allowing the second carrier C2 and the third ring gear R3 to rotate with the input shaft 1. The output gear 2 rotates at a rotational speed n5 indicated by the point of intersection between the vertical line indicating the second ring gear R2 (and the first carrier C1) directly coupled to the output gear 2 and a dotted straight line L5 in FIG. 28. The rotation is transmitted through the first carrier C1 to the output gear 2.

In the first planetary gear train G1, the first carrier C1 rotates at the rotational speed n5, and the first sun gear S1 directly coupled to the input shaft 1 rotates at the rotational speed n0. The first ring gear R1 rotates at a rotational speed n51 indicated by the point of intersection between the vertical line indicating the first ring gear R1 and a dotted straight line L5'. Although the rotational speed n51 is higher than the rotational speed n0 of the input shaft 1, since the automobile speed is high and the resistance to the running of the automobile is large while the automobile is running in the fifth gear position, the engine usually does not operate in a high speed range, and the first ring gear R1 suffers almost no overspeed problem.

The fifth gear position may be established by engaging the second brake B2 rather than the third brake B3.

In the reverse gear position or REV range, the first clutch K1 and the first brake B1 are disengaged to release the first planetary gear train G1. The rotational speeds of various elements are given as shown in FIG. 28. In the reverse gear position, the second brake B3 is engaged, holding the second sun gear S2 and the third carrier C3 against rotation. The third clutch K3 is engaged to allow the third sun gear S3 to rotate with the input shaft 1. The output gear 2 rotates at a rotational speed nR (of a negative value) indicated by the point of intersection between the vertical line indicating the second ring gear R2 (and the first carrier C1) and a dotted straight line LR.

In the first planetary gear train G1, the first carrier C1 rotates at the rotational speed nR, and the first sun gear S1 directly coupled to the input shaft 1 rotates at the rotational speed n0. The first ring gear R1 rotates at a rotational speed nR1 indicated by the point of intersection between the vertical line indicating the first ring gear R1 and a dotted straight line LR'. The first ring gear R1 rotates in a reverse direction, and the absolute value of the rotational speed nR1 is larger than the rotational speed n0. However, the first ring gear R1 suffers almost no overspeed problem since the engine is not operated in a fully throttled condition in the reverse gear position.

Although certain preferred embodiments have been shown and described, it should be understood that many changes and modifications may be made therein without departing from the scope of the appended claims.

What is claimed is:

1. A planetary gear transmission comprising:
an input member;
an output member;
three planetary gear trains disposed coaxially with each other and each having a sun gear element, a carrier element, and a ring gear element, two of the elements of each of said planetary gear trains being mechanically coupled to elements of the other planetary gear trains for rotation therewith;
the elements which are mechanically coupled to each other providing first through fifth rotating members, said first and fifth rotating members being coupled to said input member, one of said second and third rotating members being coupled to said output member, said fourth rotating member being coupled to said output member; and
a separating clutch disposed between the elements of said third rotating member, for selectively engaging and disengaging said elements of the third rotating member.

2. A planetary gear transmission comprising:
an input member;
an output member;
first, second, and third planetary gear trains disposed coaxially with each other and having respective first, second, and third sun gears, respective first, second, and third carriers, and respective first, second, and third ring gears;
said first sun gear being coupled to said input member at all times, said first carrier being coupled to said second ring gear and said output member, said second carrier being coupled to said third ring gear, said second sun gear being coupled to said third carrier;
a first brake associated with said first ring gear for holding the first ring gear against rotation;
a second brake associated with said second sun gear and said third carrier for holding the second sun gear and the third carrier against rotation;
a third brake associated with said third sun gear for holding the third sun gear against rotation;
a first clutch for selectively engaging and disengaging said third sun gear and said input member;
a second clutch for selectively engaging and disengaging said second sun gear and said input member; and
a third clutch for selectively engaging and disengaging said first ring gear, and said second carrier and said third ring gear.

3. A planetary gear transmission according to claim 2, wherein said third sun gear serves as a first rotating member, said second sun gear and said third carrier jointly as a second rotating member, said first ring gear, said second carrier, and said third ring gear jointly as a third rotating member, said first carrier and said second ring gear jointly as a fourth rotating member, said first sun gear as a fifth rotating member, said third clutch being disposed as a separating clutch between said first ring gear, and said second carrier and said third ring gear.

4. A planetary gear transmission comprising:
an input member;
an output member;
first, second, and third planetary gear trains disposed coaxially with each other and having respective first, second, and third sun gears, respective first, second, and third carriers, and respective first, second, and third ring gears;
said first sun gear being directly coupled to said input member, said first carrier being directly coupled to said second ring gear and said output member, said second and third sun gears being directly coupled to each other, said second and third carrier being directly coupled to each other;
a first brake associated with said first ring gear for holding the first ring gear against rotation;
a second brake associated with said second and third sun gears for holding the second and third sun gears against rotation;
a third brake associated with said second and third carriers for holding the second and third carriers against rotation;
a first clutch for selectively engaging and disengaging said first ring gear and said third ring gear;
a second clutch for selectively engaging and disengaging said second and third sun gears and said input member; and
a third clutch for selectively engaging and disengaging said second and third carriers, and said input member.

5. A planetary gear transmission according to claim 4, wherein said second sun gear and said third sun gear jointly serve as a first rotating member, said second and third carriers jointly as a second rotating member, said first and third ring gears jointly as a third rotating member, said first carrier and said second ring gear jointly as a fourth rotating member, said first sun gear as a fifth rotating member, said third clutch being disposed as a separating clutch between said first and third ring gears.

6. A planetary gear transmission comprising:
an input member;
an output member;
first, second, and third planetary gear trains disposed coaxially with each other and having respective first, second, and third sun gears, respective first, second, and third carriers, and respective first, second, and third ring gears;
said first sun gear being directly coupled to said input member, said first carrier being directly coupled to said second and third ring gears and said output member, said second carrier being directly coupled to said third sun gear;
a first brake associated with said first ring gear for holding the first ring gear against rotation;
a second brake associated with said second sun gear for holding the second sun gear against rotation;
a third brake associated with said second carrier and said third sun gear for holding the second carrier and the third sun gear against rotation;
a first clutch for selectively engaging and disengaging said first ring gear and said third carrier;
a second clutch for selectively engaging and disengaging said second sun gear and said input member; and
a third clutch for selectively engaging and disengaging said second carrier and said third sun gear and said input member.

7. A planetary gear transmission according to claim 6, wherein said second sun gear serves as a first rotating member, said second carrier and said third sun gear jointly as a second rotating member, said first ring gear and said third carrier jointly as a third rotating member, said first carrier, said second ring gear, and said third ring gear jointly as a fourth rotating member, said first sun gear as a fifth rotating member, said third clutch being disposed as a separating clutch between said first ring gear and said third carrier.

8. A planetary gear transmission comprising:
an input member;
an output member;
first, second, and third planetary gear trains disposed coaxially with each other and having respective first, second, and third sun gears, respective first, second, and third carriers, and respective first, second, and third ring gears;
said first sun gear being directly coupled to said input member, said first carrier being directly coupled to said second ring gear and said output member, said second sun gear being coupled to said third carrier, said second carrier being coupled to said third ring gear;
a first brake associated with said first ring gear for holding the first ring gear against rotation;
a second brake associated with said third carrier for holding the third carrier against rotation;
a third brake associated with said third sun gear for holding the third sun gear against rotation;
a first clutch for selectively engaging and disengaging said first ring gear and said third ring gear;
a second clutch for selectively engaging and disengaging said second carrier and said input member; and
a third clutch for selectively engaging and disengaging said third sun gear and said input member.

9. A planetary gear transmission according to claim 8, wherein said third sun gear serves as a first rotating member, said second sun gear and said third carrier jointly as a second rotating member, said first ring gear, said second carrier, and said third ring gear jointly as a third rotating member, said first carrier and said second ring gear jointly as a fourth rotating member, said first sun gear as a fifth rotating member, said third clutch being disposed as a separating clutch between said first ring gear, and said second carrier and said third ring gear.

* * * * *